(12) United States Patent
Pezeshki et al.

(10) Patent No.: US 11,886,425 B2
(45) Date of Patent: Jan. 30, 2024

(54) BLOCKCHAIN REGISTRY SCALING

(71) Applicant: Unstoppable Domains Inc., Las Vegas, NV (US)

(72) Inventors: Braden River Pezeshki, Reno, NV (US); Matthew Everett Gould, Reno, NV (US); Bogdan Gusiev, Kyiv (UA); Sergii Bomko, Kyiv (UA); Vladyslav Batyrenko, Kyiv (UA)

(73) Assignee: Unstoppable Domains Inc., Las Vegas, NV (US)

( * ) Notice: Subject to any disclaimer, the term of this patent is extended or adjusted under 35 U.S.C. 154(b) by 113 days.

(21) Appl. No.: 17/573,469

(22) Filed: Jan. 11, 2022

(65) Prior Publication Data
US 2022/0222245 A1    Jul. 14, 2022

Related U.S. Application Data

(60) Provisional application No. 63/137,024, filed on Jan. 13, 2021.

(51) Int. Cl.
*G06F 16/00* (2019.01)
*G06F 16/23* (2019.01)

(52) U.S. Cl.
CPC .................. *G06F 16/2379* (2019.01)

(58) Field of Classification Search
CPC .................................................. G06F 16/2379
See application file for complete search history.

(56) References Cited

U.S. PATENT DOCUMENTS

| | | | | |
|---|---|---|---|---|
| 10,361,843 B1* | 7/2019 | Suthar | ............... | H04L 9/3257 |
| 11,720,552 B2* | 8/2023 | Kasimov | ............ | H04L 63/123 |
| | | | | 709/245 |
| 11,727,366 B1* | 8/2023 | Cutler | .................. | H04L 9/0637 |
| | | | | 705/65 |
| 2017/0085555 A1 | 3/2017 | Bisikalo | | |
| 2017/0221052 A1 | 8/2017 | Sheng | | |
| 2017/0236123 A1 | 8/2017 | Ali | | |

(Continued)

FOREIGN PATENT DOCUMENTS

| | | |
|---|---|---|
| EP | 3782346 | 2/2021 |
| WO | 2019027409 | 2/2019 |
| WO | 2020051160 | 3/2020 |

OTHER PUBLICATIONS

Nick Johnson, "EIP-137: Ethereum Domain Name Service—Specification," Ethereum Improvement Proposals, No. 137, Apr. 2016. [Online serial]. Available: https://eips.ethereum.org/EIPS/eip-137.

(Continued)

*Primary Examiner* — Noosha Arjomandi
(74) *Attorney, Agent, or Firm* — Van Pelt, Yi & James LLP

(57) ABSTRACT

A request is received to perform a management action for a domain of a name service, wherein the name service is implemented using at least both a first blockchain network and a second blockchain network different from the first blockchain network. A determination is made whether the domain is currently managed on the first blockchain network or the second blockchain network. The management action for the domain is caused to be performed based on the determination of whether the domain is currently managed on the first blockchain network or the second blockchain network.

20 Claims, 12 Drawing Sheets

(56) References Cited

U.S. PATENT DOCUMENTS

| | | | |
|---|---|---|---|
| 2018/0115413 A1 | 4/2018 | King | |
| 2019/0043048 A1 | 2/2019 | Wright | |
| 2019/0108140 A1 | 4/2019 | Deshpande | |
| 2019/0166085 A1 | 5/2019 | Li | |
| 2019/0318359 A1* | 10/2019 | Arora | G06Q 20/20 |
| 2019/0340269 A1* | 11/2019 | Biernat | H04L 9/50 |
| 2019/0349426 A1 | 11/2019 | Smith | |
| 2019/0358515 A1 | 11/2019 | Tran | |
| 2020/0028691 A1* | 1/2020 | Rao | G06F 8/658 |
| 2020/0044827 A1 | 2/2020 | Snow | |
| 2020/0117690 A1 | 4/2020 | Tran | |
| 2020/0118131 A1 | 4/2020 | Diriye | |
| 2020/0133955 A1* | 4/2020 | Padmanabhan | G06Q 30/01 |
| 2020/0134656 A1* | 4/2020 | Padmanabhan | H04L 9/0637 |
| 2020/0143469 A1* | 5/2020 | Stewart | H04L 9/0643 |
| 2020/0167773 A1* | 5/2020 | Cervenka | G06Q 20/10 |
| 2020/0188131 A1 | 6/2020 | Mcluen | |
| 2020/0201560 A1* | 6/2020 | Yang | G06F 3/0655 |
| 2020/0202021 A1* | 6/2020 | Chee | G06F 21/64 |
| 2020/0213090 A1* | 7/2020 | Gupta | H04L 9/3239 |
| 2020/0322154 A1 | 10/2020 | Konda | |
| 2020/0328883 A1* | 10/2020 | Kaizer | H04L 61/4511 |
| 2020/0358784 A1* | 11/2020 | Khaund | G06F 9/468 |
| 2021/0158335 A1* | 5/2021 | Bollen | H04L 9/3239 |
| 2021/0211468 A1* | 7/2021 | Griffin | H04L 63/20 |
| 2021/0240784 A1 | 8/2021 | Xiao | |
| 2021/0328778 A1* | 10/2021 | Becher | H04L 9/008 |
| 2022/0198447 A1* | 6/2022 | Haruna | G06Q 20/389 |
| 2022/0318796 A1* | 10/2022 | Zhou | G06Q 20/3827 |
| 2023/0206216 A1* | 6/2023 | Lehmann | G06Q 20/3829 |
| | | | 705/66 |

OTHER PUBLICATIONS

Phyrex Tsai, Portal Network Team, "EIP-1062: Formalize IPFS hash into ENS(Ethereum NameService) resolver [DRAFT]," Ethereum Improvement Proposals, No. 1062, May 2018. [Online serial]. Available: https://eips.ethereum.org/EIPS/eip-1062.

Eugene Shumilov, "3 ways to use Blockchain DNS in your browser", pp. 1-3, Sep. 21, 2017, Medium, https://medium.com/@emer.tech/3-ways-to-use-blockchain-dns-in-your-browser-79d937028407 (last visited Jul. 7, 2023).

Firefox user 13228151, "Blockchain DNS," pp. 1-3, Apr. 23, 2018, Firefox Browser ADD-ONS, https://addons.mozilla.org/en-US/firefox/addon/b-dns/ (last visited Jul. 7, 2023).

Steve Despres, "DNS on Blockchain: the next evolution of domain names?", pp. 1-8, Apr. 8, 2020, Nameshield Blog, https://blog.nameshield.com/blog/2020/04/08/dns-on-blockchain-the-next-evolution-of-domain-names/ (last visited Jul. 7, 2023).

* cited by examiner

BLOCKCHAIN REGISTRY SCALING

CROSS REFERENCE TO OTHER APPLICATIONS

This application claims priority to U.S. Provisional Patent Application No. 63/137,024 entitled SCALING BLOCKCHAIN REGISTRY USING LAYER 2 filed Jan. 13, 2021 which is incorporated herein by reference for all purposes.

BACKGROUND OF THE INVENTION

A naming system allows connected resources to be identified. A user-friendly naming system can provide a human-friendly identifier that is easy to understand and remember rather than requiring the user to use a native functional identifier that is often unintuitive and difficult to remember. An example user-friendly naming system is the domain name system, which allows a user to reference a website by its human-friendly hostname/URL (Uniform Resource Locator) rather than using its IP (Internet Protocol) address. Naming systems can also function to disambiguate different resources. For example, in some naming systems, no two resources can share the same unique name.

BRIEF DESCRIPTION OF THE DRAWINGS

Various embodiments of the invention are disclosed in the following detailed description and the accompanying drawings.

DETAILED DESCRIPTION

Figure 1:
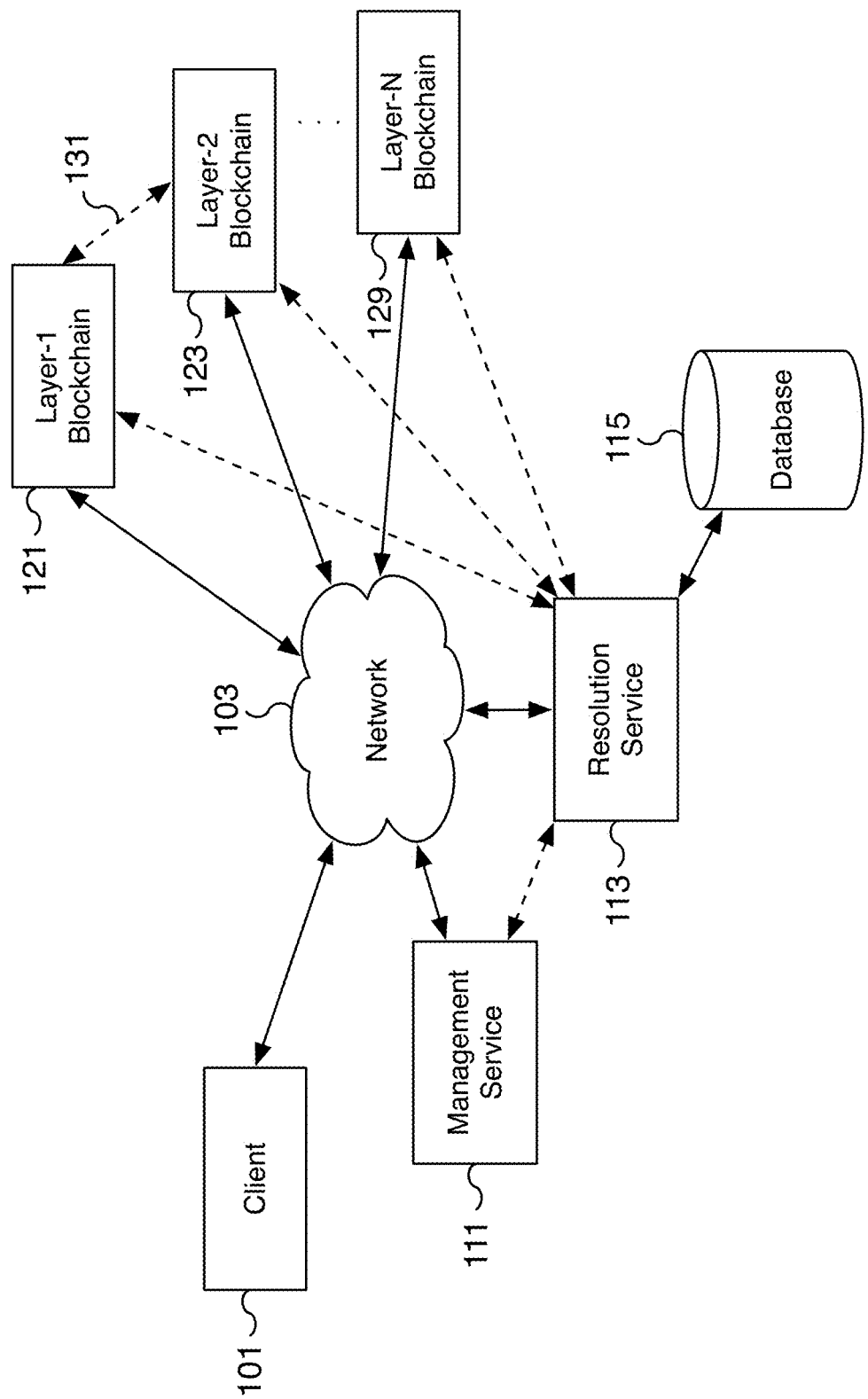
FIG. 1 is a block diagram illustrating an embodiment of a multi-layer blockchain-based name service environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Blockchain registry scaling is disclosed. Using the disclosed techniques and systems, a blockchain-based naming system can be scaled beyond a single blockchain network. For example, a multi-layer blockchain-based name service can be implemented that utilizes two or more different blockchain networks. Similarly, a single layer blockchain-based name service can be expanded to utilize additional blockchain networks. For example, for a two-layer blockchain network, existing domains can be migrated from the layer-1 blockchain to a layer-2 blockchain and new domains can be minted on the layer-2 blockchain. The ability to scale to multiple blockchains allows the naming system and its users unique advantages including the ability to select blockchain networks based on their transaction costs as well as their performance and resource profiles. For example, in some embodiments, processing transactions on a second blockchain network utilized as a layer-2 blockchain can significantly reduce transactions costs and improve performance, such as transaction latency, compared to the blockchain network utilized as a layer-1 blockchain. In some embodiments, the transaction cost for processing transactions on the second blockchain network is less than $\frac{1}{10,000}$th the transaction cost for processing transactions on the first blockchain network. The second blockchain network can offer different performance and resource profiles by utilizing compatible but potentially different technologies such as at least in part a proof of stake consensus mechanism for processing transactions.

In various embodiments, one or more domain registries or a meta registry are maintained to ensure that the multiple blockchain layers are operationally consistent. For example, a multi-layer blockchain-based name service cannot have a layer-2 blockchain overwriting an existing domain minted on the layer-1 blockchain. In various embodiments, resolution techniques are utilized to identify the appropriate blockchain network or blockchain layer used to manage a domain. The resolution techniques are utilized for both name resolution as well as domain management including updating domain management actions such as updating or modifying resolution records and domain ownership.

In some embodiments, a request is received to perform a management action for a domain of a name service. For example, a management request such as a domain migration to a different blockchain network, an update to resolution records, or a change in ownership, among other requests, is received at a management service for the name service. The name service is implemented using at least both a first blockchain network and a second blockchain network different from the first blockchain network. For example, the name service can utilize the first blockchain network as a layer-1 blockchain and the second blockchain network as a layer-2 blockchain. A domain can be minted on either of the blockchain networks and can be migrated from one network to another. In some embodiments, the two blockchain networks support a common set of virtual machine instructions. For example, both blockchain networks can be compatible with and implement the Ethereum virtual machine (EVM). In various embodiments, although the two blockchain networks are compatible, the different networks have different properties including different transaction costs, resource requirements, and/or performance profiles. In some embodiments, a determination is made whether the domain is currently managed on the first blockchain network or the second blockchain network. For example, a resolution process is performed to determine whether the authoritative records for the domain reside at the first blockchain network or the second blockchain network. The management action for the domain is performed based on the determination of whether the domain is currently managed on the first blockchain network or the second blockchain network. For example, the appropriate smart contract from the appropriate blockchain network is executed based on which blockchain network the domain is currently managed by. In some embodiments, the management service executes the appropriate smart contract functionality to modify or retrieve the authoritative records for the domain based on resolving which blockchain network is being used to currently manage the domain and its associated records.

FIG. 1 is a block diagram illustrating an embodiment of a multi-layer blockchain-based name service environment. In the example shown, the multi-layer blockchain-based name service environment includes client 101, management service 111, resolution service 113, database 115, and multiple blockchains at different layers including layer-1 blockchain 121, layer-2 blockchain 123, and layer-N blockchain 129. Client 101 includes any computer or computing device using the multi-layer blockchain-based name service. For example, client 101 can request resolution of a name of a domain of the multi-layer blockchain-based name service to a target record, update a target record for a name of a domain of the multi-layer blockchain-based name service, and/or perform any management action associated with a domain of the multi-layer blockchain-based name service. Any number of client 101 may exist. Using computer network 103, client 101 can provide different requests to management service 111, resolution service 113, and any number of blockchains such as layer-1 blockchain 121, layer-2 blockchain 123, and layer-N blockchain 129. As shown in the example of FIG. 1, client 101, management service 111, resolution service 113, database 115, layer-1 blockchain 121, layer-2 blockchain 123, and layer-N blockchain 129 are communicatively connected via computer network 103. In some embodiments, computer network 103 is the Internet.

In some embodiments, management service 111 includes one or more management servers for providing a service to manage the multi-layer blockchain-based name service executing on at least a layer-1 blockchain such as layer-1 blockchain 121 as well as a layer-2 blockchain such as layer-2 blockchain 123. In some embodiments, management service 111 is a unique identifier (UID) management service for managing unique identifiers and/or non-fungible tokens. For example, the multi-layer blockchain-based name service is an example of a non-fungible token service for managing and resolving unique domain name identifiers. As shown in the example of FIG. 1, the multi-layer blockchain-based name service utilizes multiple blockchains that function at different layers such as one or more layer-2 blockchains and/or blockchains at a layer higher than layer-2, such as layer-3, layer-4, etc. In the example shown, an example layer-2 blockchain is layer-2 blockchain 123 although multiple layer-2 blockchains can exist and be utilized by the multi-layer blockchain-based name service simultaneously. The ellipses between layer-2 blockchain 123 and layer-N blockchain 129 indicate that the multi-layer blockchain-based name service environment can utilize multiple additional layers of blockchains from layer-1 to layer-N.

Although management service 111 allows authorized users to initiate and perform domain name tasks including certain management actions via management service 111, the underlying domain information is stored on and can be directly accessed via the various blockchain layers used by the multi-layer blockchain-based name service. For example, in various embodiments, domain name records are stored on layer-1 blockchain 121, layer-2 blockchain 123, and/or layer-N blockchain 129. An authorized user such as a domain owner can, via client 101, submit transactions directly to the appropriate blockchain layer to perform certain management actions for the owner's domain. For example, an owner can update the resolution records for a domain by directly submitting a transaction to the appropriate blockchain layer for the domain. While many management actions can be performed directly by an authorized user to the appropriate blockchain, certain management actions require additional privileges not granted to typical users. For example, minting a new domain can require a user initiate the action via management service 111. As another example, actions to upgrade the multi-layer blockchain-based name service, such as adding an additional bridge, adding support for an additional blockchain layer, and/or modifying the list of allowable top-level domains (TLDs), among other upgrades, can require access to specific administrative accounts, such as an upgrade or minting administrative account. In various embodiments, these accounts can be implemented at least in part by smart contracts and their functionality may only be accessible via management service 111.

In various embodiments, rather than directly managing the multi-layer blockchain-based name service via blockchain layer-1 blockchain 121, layer-2 blockchain 123, and/or layer-N blockchain 129, an owner of a domain or unique identifier uses a service provided by management service 111 to assist the owner by performing management actions related to the blockchains for the owner. The owner may grant management service 111 authorization to manage its domain(s) (e.g., via as an approved user, as an operator, or per management action meta-transaction). This allows a management action request received at management service 111 from client 101 to be initiated by management service 111 on the applicable blockchains, such as layer-1 blockchain 121, layer-2 blockchain 123, and/or layer-N blockchain 129, as appropriate. In various embodiments, layer-1 blockchain 121, layer-2 blockchain 123, and layer-N blockchain 129 each include one or more distributed network(s) of servers and computers implementing a crypto blockchain (e.g., Ethereum, Ethereum-compatible, or another blockchain) that enables smart contracts of the blockchain-based name service to be executed.

In some embodiments, resolution service 113 includes one or more resolution servers for resolving a blockchain-based name configured on the multi-layer blockchain-based name service environment. For example, client 101 can utilize resolution service 113 to resolve a name of a domain of the multi-layer blockchain-based name service to a target record. In some embodiments, an instance of resolution service 113 is included as part of management service 111. In some embodiments, multiple instances (not shown) of resolution service 113 can exist, and each can be operated by a different organization. For example, resolution service 113 can be operated by a third-party with respect to management service 111 and can respond to resolution requests using data directly derived from the data stored on the various blockchains. By allowing third parties to manage and host their own resolution services, each third-party is less dependent on management service 111 and can rely more directly on the data stored on the blockchains.

In some embodiments, resolution service 113 stores copies or partial copies of the data from the various blockchains such as layer-1 blockchain 121, layer-2 blockchain 123, and/or layer-N blockchain 129 for performing unique identifier resolution. By caching the blockchain data, resolution service 113 can improve the performance of resolution results including reducing latency. As shown by the dashed arrows in FIG. 1, resolution service 113 can communicate with management service 111, layer-1 blockchain 121, layer-2 blockchain 123, and/or layer-N blockchain 129. In various embodiments, resolution service 113 utilizes a data store such as database 115 to store blockchain data and/or results that correspond to the actual blockchains such as layer-1 blockchain 121, layer-2 blockchain 123, and/or layer-N blockchain 129. For example, in some embodiments, database 115 is used to store copies of blockchain data, blockchain smart contracts, and/or blockchain programs that are utilized by resolution service 113.

In some embodiments, data associated with the multi-layer blockchain-based name service is stored on one or more blockchains. For example, a two-layer blockchain-based name service can utilize a layer-1 blockchain and a layer-2 blockchain. In this example, layer-1 blockchain 121 is a first layer blockchain of the multi-layer blockchain-based name service and layer-2 blockchain 123 is a second layer blockchain of the multi-layer blockchain-based name service. By utilizing a second layer blockchain, the performance and efficiency of the blockchain-based name service is improved compared to utilizing only a single layer blockchain (e.g., only layer-1 blockchain 121). Transactions performed on a layer-2 blockchain such as layer-2 blockchain 123 can be significantly less expense and/or have improved performance compared to transactions performed on a layer-1 blockchain such as layer-1 blockchain 121. For example, in some embodiments, the transaction cost for processing transactions on a layer-2 blockchain such as layer-2 blockchain 123 can be less than 1/10,000th the transaction cost for processing transactions on the layer-1 blockchain such as layer-1 blockchain 121. The different blockchains can further utilize different but compatible underlying technologies. For example, layer-1 blockchain 121 may use a proof of work consensus mechanism for processing transactions whereas layer-2 blockchain 123 may use at least in part a proof of stake consensus mechanism for processing transactions. In various embodiments, the different blockchain layers support a common set of virtual machine instructions. For example, the different blockchain layers can be compatible with and implement the same virtual machine, such as the Ethereum virtual machine (EVM). In some embodiments, the improvements from utilizing multiple layered blockchains include reduced latency, increased energy efficiency, and/or reduced transaction costs, among others. As another example, a three-layer blockchain-based name service can utilize first, second, and third layer blockchains. Data and smart contracts can be offloaded from the first and second layer blockchains into a third layer blockchain and/or stored in the appropriate first, second, or third blockchain as appropriate. For example, layer-1 blockchain 121 can function as a first layer blockchain, layer-2 blockchain 123 can function as a second layer blockchain, and layer-N blockchain 129 can function as a third layer blockchain of the blockchain-based name service. Depending on the configuration, target records of a domain name or unique identifier can be stored at any layer.

As shown in FIG. 1, layer-1 blockchain 121 and layer-2 blockchain 123 can interface via bridge 131. In various embodiments, a bridge allows blockchains functioning at different layers to interface with one another. Bridge 131 is one example of a blockchain layer bridge and serves as an interface between layer-1 blockchain 121 and layer-2 blockchain 123. In various embodiments, each bridge can utilize its own security model and protocols independent of the blockchain endpoints. Using bridge 131, assets, ownership data, target records, and other data can be securely transferred between blockchains and the data stored on the different blockchains can be synchronized. Although only bridge 131 is shown, additional bridges can exist both between the same pair of blockchains (e.g., layer-1 blockchain 121 and layer-2 blockchain 123) and between other blockchains. For example, a bridge (not shown) can exist between layer-2 blockchain 123 and layer-N blockchain 129 in the event layer-N blockchain 129 is configured as a layer-3 blockchain. As another example, a bridge (not shown) can exist between layer-1 blockchain 121 and another layer-2 blockchain not shown.

Figure 2:
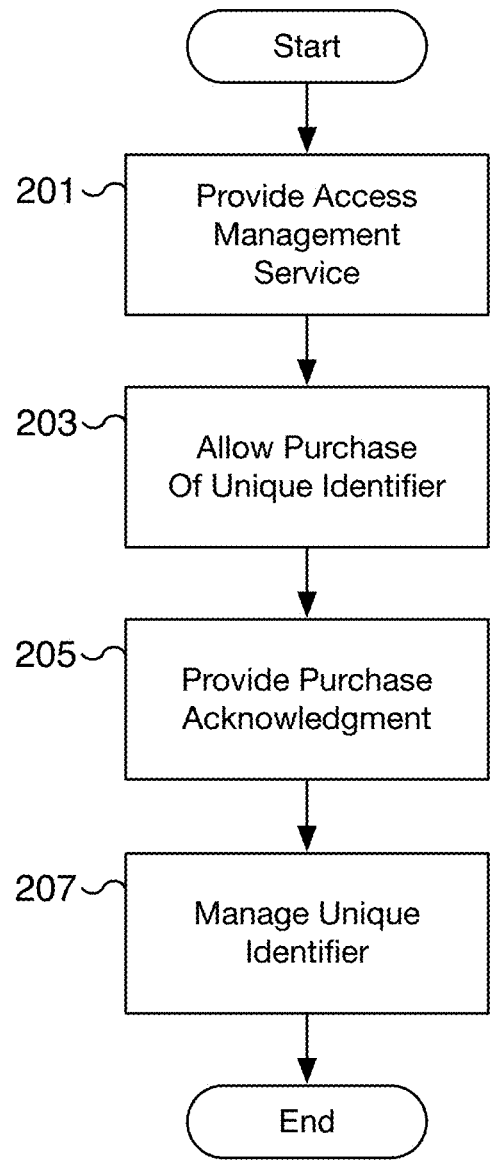
FIG. 2 is a flowchart illustrating an embodiment of a process for managing a domain of a multi-layer blockchain-based name service.

FIG. 2 is a flowchart illustrating an embodiment of a process for managing a domain of a multi-layer blockchain-based name service. For example, a user of a multi-layer blockchain-based name service can interface with a management service of the multi-layer blockchain-based name service to perform a variety of domain name management actions such as purchasing a domain name, minting a domain name, transferring and/or selling a domain name, migrating the data records associated with a domain name between different blockchains, such as from a layer-1 blockchain to a layer-2 blockchain or vice versa, and updating the target records associated with a domain name, among other actions. In some embodiments, at least a portion of the process of FIG. 2 is implemented by management server(s) (e.g., one or more servers of management service 111 of FIG. 1) providing management services for managing a multi-layer blockchain-based name service executing on distributed computers of multiple blockchains. In some embodiments, at least a portion of the process of FIG. 2 is implemented on one or more networked computers implementing distributed blockchains (e.g., one or more computers of layer-1 blockchain 121, layer-2 blockchain 123, and/or layer-N blockchain 129 of FIG. 1). In various embodiments, the user accesses the management services of the multi-layer blockchain-based name service via a client such as client 101 of FIG. 1. In some embodiments, the management service of the multi-layer blockchain-based name service is management service 111 of FIG. 1 and the multi-layer blockchain-based name service utilizes multiple blockchains including at least layer-1 blockchain 121 and layer-2 blockchain 123 of FIG. 1. In various embodiments, the multi-layer blockchain-based name service environment is the multi-layer blockchain-based name service environment of FIG. 1. Although described with respect to a domain name, the process of FIG. 2 can apply to any multi-layer blockchain-based unique identifier and/or non-fungible token.

At 201, access to a management service is provided. For example, a user interface is provided via an application such as a web application and/or mobile smartphone application. The access can require that the user authenticate and/or verify the identity of the user. For example, to purchase a unique identifier such as a domain name, the user may be required to provide a form of identification to associate the purchased unique identifier with an owner. In some embodiments, the unique identifier for the owner is a cryptocurrency account address. In various embodiments, the user also configures a payment method. The payment method can include traditional payment methods such as credit card, debit card, check, and/or bank transfer, etc. as well cryptocurrency options. In some embodiments, the user configures a cryptocurrency wallet as part of accessing the management service and managing the domain name.

At 203, the purchase of a unique identifier is allowed. For example, the user requests to purchase a unique identifier such as a domain name. A determination is made that the requested name is available for purchasing. In the event the name is available and the user meets the purchase requirements (sufficient funds, appropriate configuration, etc.), the purchase of the unique identifier is allowed. In some embodiments, the user designates which blockchain layer the purchase should be recorded on. For example, when utilizing the multi-layer blockchain-based name service, the record of ownership can be stored on the layer-1 blockchain or a layer-2 blockchain. In various embodiments, the ownership is minted to the appropriate blockchain as a public and tamper-proof record. Once minted at the configured blockchain, the same unique identifier can no longer be minted on any of the other associated blockchains of the multi-layer blockchain-based name service. For example, once a purchased domain name is minted on the layer-2 blockchain, the same name can no longer be minted on the layer-1 blockchain.

At 205, an acknowledgment of a purchase of the unique identifier is provided. For example, the user or purchaser is provided with an acknowledgement from the management service that the purchase transaction has been or will be completed with a high degree of confidence. In some embodiments, the acknowledgement is based on associating an identifier of the owner, such as the owner's cryptocurrency account address, with the purchased unique identifier. In some embodiments, once the purchase has been acknowledged, the target record for the unique identifier can be resolved using the multi-layer blockchain-based name service. For example, using a resolution service such as resolution service 113 of FIG. 1, the unique identifier can be resolved to a target record such as an Internet Protocol (IP) address, Uniform Resource Locator (URL) or web address, email address, social media account, or another address location, etc.

At 207, the unique identifier is managed. For example, the user can manage the purchased unique identifier such as modifying target records associated with the unique identifier. In some embodiments, the modifications impact how the unique identifier is resolved. As target records are updated, the resolution of the unique identifier is also updated. In some embodiments, the management includes the ability to move or migrate the unique identifier from one blockchain, such as a layer-1 blockchain, to another blockchain, such as a layer-2 blockchain, of the multi-layer blockchain-based name service. The management of the unique identifier can also include transferring ownership of the unique identifier to another user or cryptocurrency account address.

In some embodiments, domain owners of a lower layer domain (e.g., a domain minted on the layer-1 blockchain) can migrate the domain to a higher blockchain layer (e.g., a layer-2 blockchain) using one of a variety of techniques as disclosed. For example, the migration from a layer-1 blockchain to a layer-2 blockchain can utilize one or potentially multiple allowed smart contract bridges, such as bridge 1111 of FIG. 11, to withdraw a domain minted on and from the layer-1 blockchain and deposit the domain on the layer-2 blockchain. As another example, the process of FIG. 7 describes a migration technique that does not require a bridge smart contract and the associated transaction costs for transacting on both blockchains. As yet another example, in one embodiment, an owner of a domain minted on the layer-1 blockchain can sign a message with their private key authorizing the minting of the domain they own as an entry on the layer-2 blockchain. The signed message can be stored in a smart contract on the layer-2 blockchain, for example, inside a layer-2 registry smart contract or as a separate smart contract. In some embodiments, the signed message is stored by a resolution service and/or at servers that resolve or assist in resolving domain names. The signed message is used to prevent duplicative domains from being minted on the layer-2 blockchain. In some embodiments, the state of the layer-1 registry can be further stored inside the layer-2 registry as a Merkle root. The message authorizing the minting of the owner's domain on the layer-2 blockchain can additionally include a proof of inclusion to prevent duplicative domains from being minted on the layer-2 blockchain. In various embodiments, a second message on the layer-1 blockchain is signed by the domain owner. The second message grants permission to burn the domain on the layer-1 blockchain. By granting anyone permission to burn the domain on the layer-1 blockchain, others are incentivized (and discouraged) to not acquire the layer-1 domain entry on secondary markets including other blockchain networks such as the layer-2 blockchain.

Figure 3:
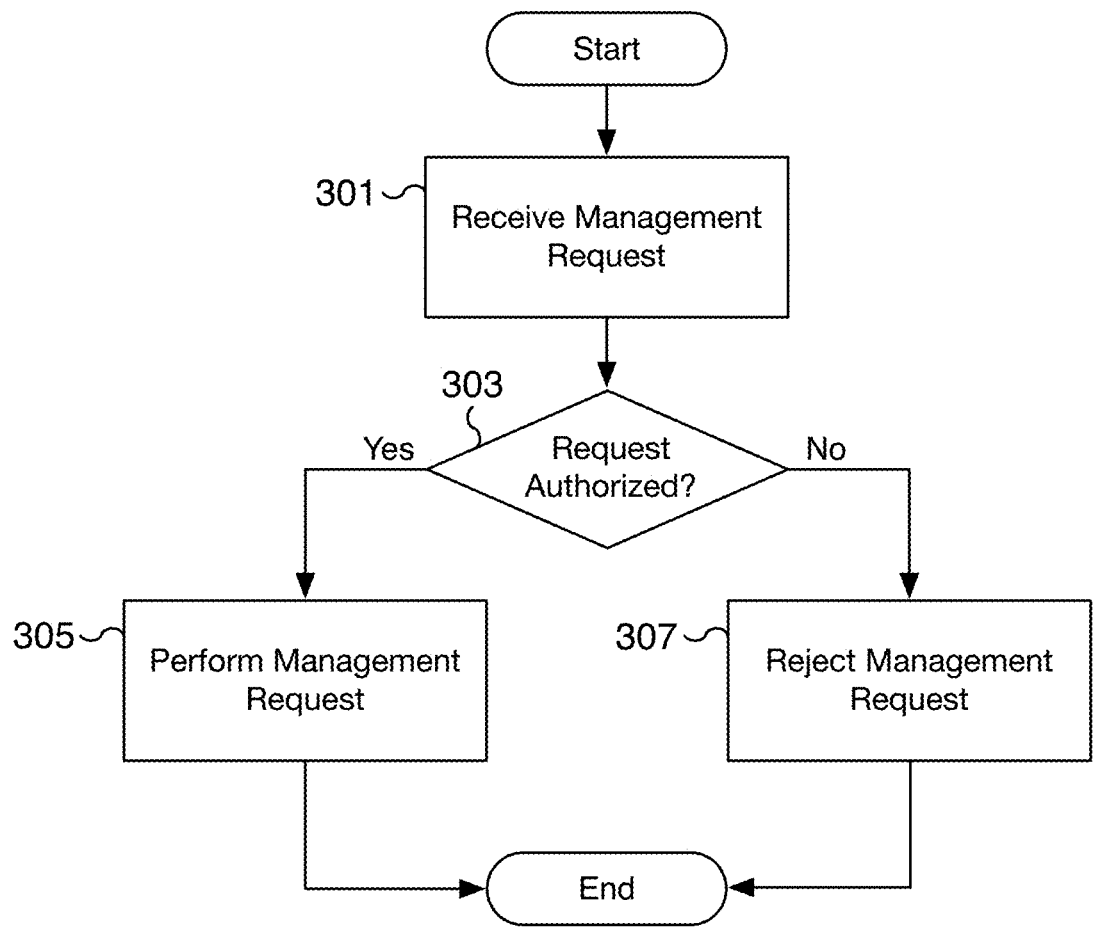
FIG. 3 is a flowchart illustrating an embodiment of a process for responding to a management action for a domain of a multi-layer blockchain-based name service.

FIG. 3 is a flowchart illustrating an embodiment of a process for responding to a management action for a domain of a multi-layer blockchain-based name service. For example, an owner of a domain name registered with a multi-layer blockchain-based name service accesses a management service of the multi-layer blockchain-based name service to perform a variety of domain name management actions. Each management action can be submitted as a management request to the management service. Example management action requests can include actions such as transferring and/or selling a domain name, migrating the data records associated with a domain name between different blockchains, such as from a layer-1 blockchain to a layer-2 blockchain or vice versa, and updating the target records associated with a domain name, among other actions. In some embodiments, the process of FIG. 3 is performed at 207 of FIG. 2. In various embodiments, the user accesses the management services of the multi-layer blockchain-based name service via a client such as client 101 of FIG. 1. In some embodiments, the management service of the multi-layer blockchain-based name service is management service 111 of FIG. 1 and the multi-layer blockchain-based name service utilizes multiple blockchains including at least layer-1 blockchain 121 and layer-2 blockchain 123 of FIG. 1. In various embodiments, the multi-layer blockchain-based name service environment is the multi-layer blockchain-based name service environment of FIG. 1. Although described with respect to a domain name, the process of FIG. 3 can apply to any multi-layer blockchain-based unique identifier and/or non-fungible token.

At 301, a management request is received. The management action may be one or more of the following: transfer a domain to a new owner, set a resolver contract for a domain, create a new subdomain for the domain, remove/burn a domain, add or remove an approved account that can control the domain, migrate a domain to a different blockchain layer, and/or add or remove an operator account for an owner that can control every domain owned by the owner (e.g., the request is for an owner account rather than only for a specific domain), among others. The request can identify the domain via a hash identifier (e.g., a hash identifier can serve as the identifier of the non-fungible token representing the domain). The hash identifier is a more storage efficient representation of the name of the domain and the name of the domain can be easily converted to a hash identifier using a hash function. In some embodiments, the request is made to a registry smart contract by a requestor by performing a program function call to an address of the registry smart contract on a blockchain. In various embodiments, the smart contract can be located at any layer of the blockchain of a multi-layer blockchain-based name service. In some embodiments, the default smart contract is located at layer-1 and auxiliary smart contracts can be located at subsequent blockchain layers such as at a layer-2 blockchain. Depending on which layer the target records are stored, different smart contracts may be utilized. In some embodiments, a process is performed to first determine which layer of the blockchain the domain name is stored, and the program function call is made to an address of the registry smart contract on the appropriate blockchain.

At 303, a determination is made whether the request is authorized. In the event the request is authorized, processing proceeds to 305 where the management request is performed. In the event the request is not authorized, processing proceeds to 307 where the management request is rejected. In some embodiments, a request is authorized if it is provided by an owner of a domain, an approved alternative account specified for the domain (e.g., specified using the registry smart contract), or an operator account specified (e.g., using the registry smart contract) to be allowed to control every domain owned by the owner. In order to prove that the user account that provided the request is authentic, the user account can sign the request using a private cryptographic key of the user account and this signature is verified using a public key of the user account to authenticate the user account. In the event the authenticated user account is an owner, an approved account, or an operator of the domain according to the blockchain record of the registry smart contract, it is determined that the request is authorized. In the event the account that provided the request cannot be authenticated or the authenticated user account is not authorized for the domain, the request is not authorized.

In some embodiments, an authorized account is able to provide temporary authorization on a per management action transaction level by signing a request message for another account that can provide the request message for later execution when presented. For example, to grant temporary management authority on a per request level via a meta-transaction, an owner, an approved account, or an operator for a domain is able to sign a request using its private cryptographic key and provide it to another user/account that will issue the request for execution when desired. This allows the authorized management of the meta-transaction to be asynchronously executed when desired by the other user/account. In the event the received request is specified as a meta-transaction, the request includes the signature of the authorized account of the domain of the request (different from the account that provided the request) and this signature is verified to ensure it is authentic. If it is authentic and the account that signed it is an owner, an approved account, or an operator for the domain, it is determined that the request is authorized. Otherwise, the meta-transaction request is not authorized.

At 305, a management request is performed. For example, the management action is allowed to be performed if the request is determined to be authorized at 303. Examples of performed management actions include transferring the domain of the request to a new owner, setting one or more resolution targets for the domain, creating a subdomain for the domain, deleting or burning the domain, adding or removing an approved account that can control the domain, adding or removing an operator account for an owner that can control every domain owned by the owner, and/or migrating the domain to a different blockchain layer of the multi-layer blockchain-based name service.

At 307, the management request is rejected. For example, the management action is not allowed to be performed and is rejected if the request is determined to not be authorized at 303. In some embodiments, the rejected management request is logged and the appropriate owner is notified. In some embodiments, the security level for the domain is increased based on the occurrence of one or more unauthorized management requests.

Figure 4:
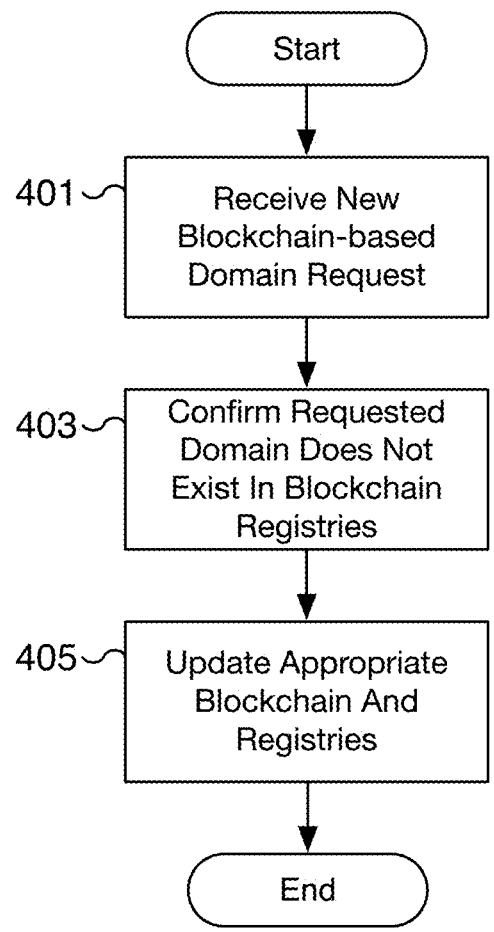
FIG. 4 is a flowchart illustrating an embodiment of a process for creating a new domain for a multi-layer blockchain-based name service.

FIG. 4 is a flowchart illustrating an embodiment of a process for creating a new domain for a multi-layer blockchain-based name service. For example, using the process of FIG. 4, a new domain associated with a management request can be minted on one of the layers of a multi-layer blockchain-based name service. As part of the new domain creation process, the domain cannot previously exist on any of the blockchain layers of the multi-layer blockchain-based name service. For example, a new domain can only be minted on the layer-2 blockchain if it does not overwrite an existing domain on any of the other blockchain layers (e.g., the layer-1 blockchain for a 2-layer blockchain-based name service). In some embodiments, a registry is updated that keeps track of all domains minted on the lower layer blockchains. For example, a layer-2 registry is maintained that tracks all domains minted on the layer-1 blockchain. In some embodiments, the process of FIG. 4 is performed at 207 of FIG. 2 and/or at 303, 305, and/or 307 of FIG. 3. In various embodiments, the multi-layer blockchain-based name service environment is the multi-layer blockchain-based name service environment of FIG. 1.

At 401, a request to create a new blockchain-based domain is received. In various embodiments, the request identifies the new domain name and the owner. In some embodiments, a hash identifier can be determined for the domain and the hash identifier can be used internally to reference the unique domain name. In some embodiments, the request further specifies which blockchain layer of the multi-layer blockchain-based name service the request should be stored. For example, for a two-layer blockchain-based name service, the new domain can be minted on either the layer-1 blockchain or the layer-2 blockchain. Each blockchain layer has its own advantages and disadvantages. In some embodiments, the user specifies which blockchain layer to store the records associated with the new domain and/or a default blockchain layer can be used.

At 403, the requested domain is confirmed to not exist in any blockchain registries. In various embodiments, one or more blockchain registries track the domain names already created or minted including the domains minted on other registries. The domains minting on other registries can be tracked using one or more domain disallow lists or Merkle non-inclusion proofs. For example, for a two-layer blockchain-based name service, a layer-1 registry can track all the domain names minted on the layer-1 blockchain and their layer-1 blockchain resolution records. The layer-1 registry can also maintain a registry of layer-2 domains that have been minted on the layer-2 blockchain and should be disallowed from being minted on the layer-1 blockchain. Similarly, a layer-2 registry can track all the domain names minted on the layer-2 blockchain and their layer-2 blockchain resolution records. The layer-2 registry can also maintain a registry of layer-1 domains that have been minted on the layer-1 blockchain and should be disallowed from being minted on the layer-2 blockchain. In various embodiments, the various registries can be implemented as one or more separate registries and the location of the registries can vary and/or may be replicated. In some embodiments, a registry and/or a copy of the registry is stored at a management service such as management service 111 of FIG. 1 and/or at a resolution service such as resolution service 113 of FIG. 1.

In various embodiments, the registry of domains minted on other blockchain layers can be implemented using one or more different techniques. For example, in some embodiments, a domain registry is implemented as a domain deny or disallow list. For a particular blockchain layer, a list of all domains minted at other blockchain layers is maintained and stored inside a registry smart contract. Each new domain is confirmed to not exist on the deny list before the new domain is allowed to be minted at that particular blockchain layer. For example, when an authorized user (and/or authorized public key) attempts to mint a requested domain on a particular blockchain, one or more registry smart contracts are used to check the domain deny lists(s) to ensure that the requested domain has not been previously minted at different blockchain layers. Prior to minting, a domain registry for the particular blockchain layer is also checked to confirm that the requested domain has not been minted on that particular blockchain. In various embodiments, the deny list registry is tracked for at least domains created at the layer-1 blockchain. For example, when a new domain is minted on the layer-2 blockchain, the deny list registry for the layer-1 blockchain is checked to confirm that the new domain will not collide or overwrite an existing domain minted on the layer-1 blockchain.

In some embodiments, the domain registry is implemented using non-inclusion proofs, such as sparse Merkle tree non-inclusions proofs. For example, for a particular blockchain registry, a Merkle root representing the state of a domain registry for another blockchain layer can be stored inside the registry. When an authorized user, such as a user represented by an authorized public key, attempts to mint a domain, the authorized public key must also submit a Merkle non-inclusion proof alongside the minting transaction to prove that the domain being minted was inside the state of the domain registry for the other blockchain layer.

At 405, the appropriate layer blockchain and blockchain registries are updated. For example, a new domain is minted by updating the blockchain for the appropriate layer. In some embodiments, the blockchain is associated with the authorized user and/or an authorized public key. Moreover, the domain name can be referenced in the blockchain using the domain's hash identifier. In some embodiments, storing the domain as a hash identifier helps to optimize the storage requirements for the newly requested domain. In various embodiments, the appropriate domain registries are also updated to prevent future domain name collisions. For example, when a new domain is minted on the layer-1 blockchain instead of the layer-2 blockchain, the associated registry smart contracts representing the layer-1 blockchain domains are updated to include the newly minted domain. By tracking the domains minted on the different blockchain layers, including lower layer blockchains (e.g., at the layer-1 blockchain), future attempts to mint the same domain on another blockchain layer (e.g., the layer-2 blockchain) will be rejected. In some embodiments, updating the registries includes updating a domain deny or disallow list or associated sparse Merkle tree non-inclusions proofs used to track another blockchain layer.

Figure 5:
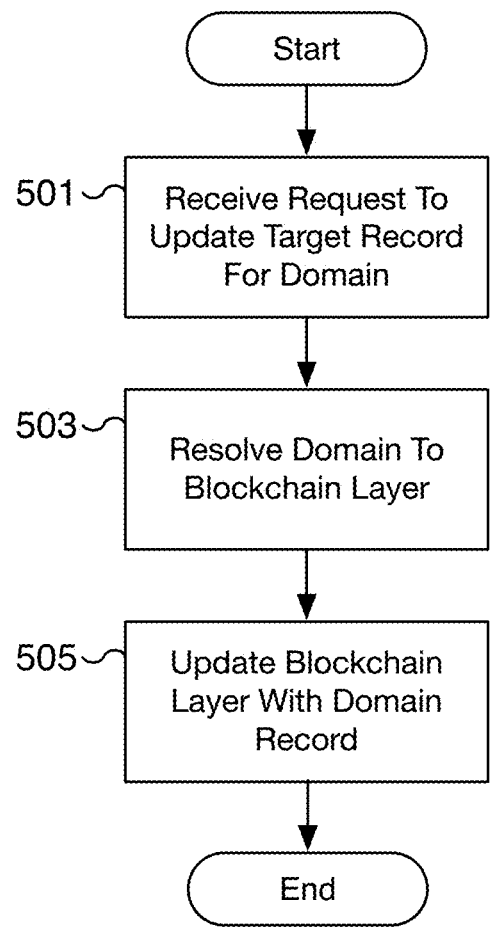
FIG. 5 is a flowchart illustrating an embodiment of a process for updating target records of a domain managed using a multi-layer blockchain-based name service.

FIG. 5 is a flowchart illustrating an embodiment of a process for updating target records of a domain managed using a multi-layer blockchain-based name service. For example, using the process of FIG. 5, the resolution targets for a domain can be modified and updated. Since the target records can be stored at different blockchain layers, management of a domain using a multi-layer blockchain-based name service can require a resolution step to determine which layer the domain is minted on. In some embodiments, the target records for a domain name are stored in a resolver smart contract and a registry smart contract stores the address of the resolver smart contract. Although at times described herein as two separate smart contracts, in some embodiments, the registry smart contract and the resolver smart contract are implemented together within the same smart contract. For example, the registry smart contract can include the resolver functionality. As another example, in some embodiments, a registry smart contract only requires limited resolver functionality since the relevant domain data can be stored directly in the storage component of the registry smart contract and an additional resolution step to identify a resolver smart contract is not required. In some embodiments, the process of FIG. 5 is performed at 207 of FIG. 2 and/or at 303, 305, and/or 307 of FIG. 3. In various embodiments, the multi-layer blockchain-based name service environment is the multi-layer blockchain-based name service environment of FIG. 1.

At 501, a request to update a target record for a domain is received. For example, a request to update the target record is initiated at a management service such as management service 111 by a client such as client 101 of FIG. 1. The request to update a target record can identify the domain via a hash identifier of the name of the domain (e.g., serves as the identifier of the non-fungible token representing the domain). In various embodiments, a target record of a specified type is received and used for updating the target records.

At 503, the domain is resolved to a blockchain layer. For example, the domain can be stored at different layers of a multi-layer blockchain-based name service, such as at a layer-1 blockchain, a layer-2 blockchain, or another blockchain layer, as appropriate. In various embodiments, the domain resolution is performed to identify which blockchain layer the domain is stored at so that the corresponding target records can be updated. In some embodiments, the resolution requires reading from a registry for every blockchain layer to determine which blockchain layer the target records are stored in. For example, a registry for each blockchain layer, which can be implemented as a smart contract on that blockchain, stores the resolver smart contract for each registered domain, which can also be stored on the same blockchain. The corresponding target records for the domain can be retrieved from the resolver smart contract. The target records are then used to resolve the domain to one or more resolution values, such as an Internet Protocol (IP) address, a website or URL, an email address, a unique name for a network platform such as a social media platform, etc. In some embodiments, the resolution value is based on a record type such as a protocol, property, and/or attribute type. An example of a list of record types able to be updated by the resolver smart contract includes: a cryptocurrency account address, a preferred browser protocol, a browser redirect URL (e.g., allowing redirection at the name service level), a distributed web record, an IPFS network content hash, a swarm network content hash, a web DNS record, a default TTL setting, a DNS CNAME, an IP address, a deprecated record, an account username, an email address, a chat user identifier, a social network user identifier, and other communication user identifiers, among others.

In some embodiments, the domain is resolved using a meta registry. For example, a meta registry can encapsulate the registries of the different blockchain layers with additional functional logic for performing resolution. By querying the meta registry, a domain can be resolved to one or more specific blockchain layers that the domain configuration resides at. In some embodiments, the meta registry includes a registry at each different blockchain layer, functions as an interface capable of querying multiple registries, and/or operates to keep the different registries synchronized and compatible.

At 505, a blockchain layer with a domain record is updated. In some embodiments, a resolver smart contract located at 503 is updated to associate a new or revised target record of a specified type to the domain. In some embodiments, the update is performed by initiating a request to the identified resolver smart contract of the domain. The request can be initiated by performing a program function call to an address of the resolver smart contract on the identified blockchain. The request to update a target record can identify the appropriate domain to update via a hash identifier of the name of the domain (e.g., serves as the identifier of the non-fungible token representing the domain).

In some embodiments, the same name of a domain is able to be resolved into multiple different target records of different types. For example, a request to resolve a name of a domain identifies a desired target identifier or action type and the resolver smart contract is able to look up and return a target identifier/action of a particular type among many different types stored by the resolver smart contract for the same domain. Thus the resolver smart contract is able to store in its records for the particular domain, key-value pairs of target record type keys and target identifier values, allowing the resolver smart contract to effectively map the domain (e.g., hash of a name of the domain) to key-value dictionaries of records. The request received at 501 may specify a command to add, modify, or delete the target record of the domain using a target record type (e.g., key) and/or a corresponding data/identifier (e.g., value) specified in the request.

In various embodiments, a single resolver smart contract may be able to manage and handle resolution of multiple different domains and the resolver smart contract includes a different preset for different domains and each preset holds records for the domain. For example, in some embodiments, the records inside the resolver smart contract are stored as a nested mapping from Domain Token ID->Preset ID->Key->Value. This nested structure allows users to configure domains on the un-enumerable Ethereum mappings (e.g., it is expensive and unreliable to store an enumerable data structure on Ethereum), allowing an authorized user to change the preset associated with a domain to link an entirely different set of records to the domain. In some embodiments, a token identifier of the domain is included in an update request. Using the token identifier, the resolver smart contract identifies the corresponding preset, and the type and value of the target record (e.g., key/value pair) are updated (e.g., added, removed, or modified) under the identified preset.

Figure 6:
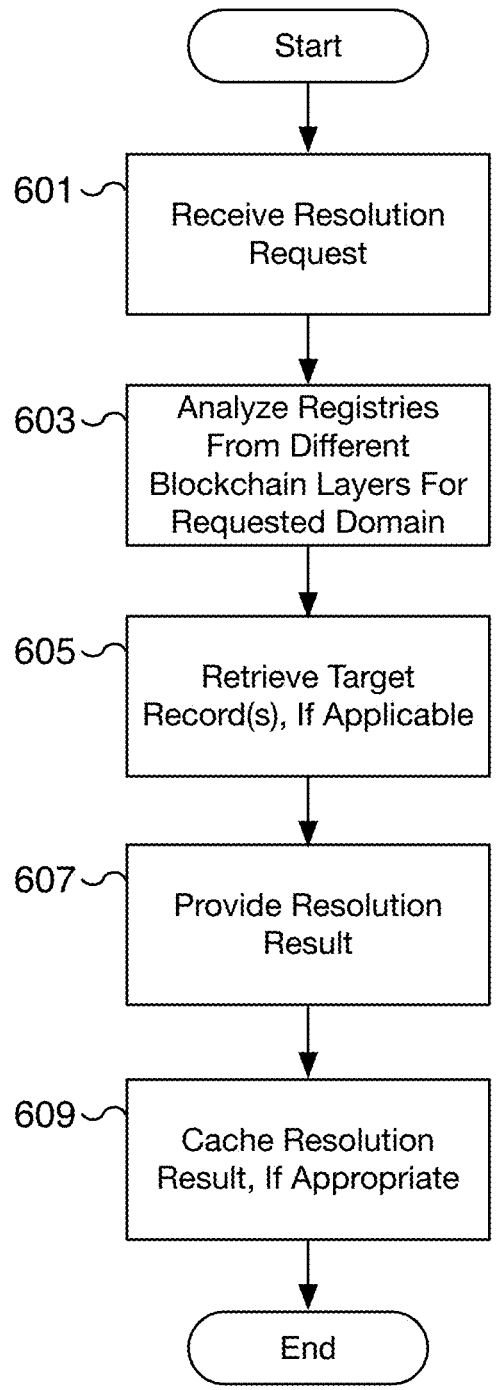
FIG. 6 is a flowchart illustrating an embodiment of a process for resolving a domain of a multi-layer blockchain-based name service.

FIG. 6 is a flowchart illustrating an embodiment of a process for resolving a domain of a multi-layer blockchain-based name service. For example, using the process of FIG. 6, the specific blockchain layers a domain of a multi-layer blockchain-based name service is configured using can be identified. Once the appropriate blockchain layer or layers are identified, the domain and its associated properties, such as target records, ownership, and blockchain layer, can be modified. As another example, using the process of FIG. 6, the target records for a domain of a multi-layer blockchain-based name service can be resolved allowing a client to resolve a domain name to one of multiple target resolution values. In some embodiments, the process of FIG. 6 and/or part of the process of FIG. 6 is performed at 207 of FIG. 2, at 303, 305, and/or 307 of FIG. 3, and/or at 503 of FIG. 5. In some embodiments, the resolution process is performed by a management service such as management service 111 of FIG. 1 and/or by a resolution service such as resolution service 113 of FIG. 1. In various embodiments, the multi-layer blockchain-based name service environment is the multi-layer blockchain-based name service environment of FIG. 1.

At 601, a resolution request is received. For example, a request to resolve a domain to a blockchain layer is received. In some embodiments, the domain can be configured on one or multiple layers of a multi-layer blockchain-based name service. For example, a domain can be minted on a layer-2 blockchain to minimize interaction and transaction costs associated with the layer-1 blockchain of the name service. In the example, the resolution request received is performed to determine that the layer-2 blockchain is the appropriate blockchain layer for modifying or resolving the domain. In some embodiments, the resolution request when performed returns an associated address of the domain such as a smart contract address of the identified blockchain layer and/or target records retrieved for the domain from the identified blockchain layer.

At 603, registries from different blockchain layers are analyzed for the requested domain. For example, in some embodiments, a meta registry representing all registries of the different blockchain layers of the multi-layer blockchain-based name service is queried to identify the applicable blockchain layer and/or corresponding smart contract on the applicable blockchain layer. In some embodiments, each blockchain layer has a registry that is queried for the domain. In the event the registry has knowledge of the domain, the result of the registry query is analyzed. For example, for a two-layer blockchain-based name service, a layer-1 blockchain registry tracks the domains minted on the layer-1 blockchain and a layer-2 blockchain registry tracks the domains minted on the layer-2 blockchain. Each registry returns whether the domain has been minted on the corresponding blockchain layer. In the event the domain has only been minted on the lower layer blockchain (e.g., layer-1 blockchain), resolution is performed using the blockchain used for minting (e.g., the layer-1 blockchain). In the event the domain has only been minted on a higher layer blockchain (e.g., a layer-2 or higher blockchain), resolution is performed using higher layer-1 blockchain. At 603, the appropriate blockchain layer is determined. In some embodiments, the determination includes identifying a corresponding smart contract of the determined blockchain layer, such as the appropriate registry and/or resolver smart contract.

In some embodiments, multiple registries may return that the domain has been minted on the corresponding blockchain. For example, a domain may be minted on a layer-1 blockchain and is subsequently migrated to the layer-2 blockchain. At the layer-2 blockchain, a domain attribute is set that disables solution using the layer-1 blockchain. In various embodiments, the higher layer blockchain, if properly authenticated, can disable and/or invalidate portions of the domain information stored in a lower layer blockchain. This approach allows migration of a layer-1 domain to a higher layer without incurring additional transaction costs from the layer-1 blockchain during migration. In some embodiments, one embodiment of the migration process is described with respect to FIGS. 7-10.

At 605, the target records of the domain are retrieved, if applicable. For example, in the event the resolution request requires target records, the appropriate target records are retrieved. In some embodiments, the retrieval involves determining a location of one or more resolver smart contracts on the blockchain layer identified at 603. For example, the appropriate registry of the blockchain layer identified at 603 can be queried to retrieve one or more corresponding resolver smart contracts for the domain. The appropriate target records can then be retrieved from the identified resolver smart contract. In some embodiments, the target records are retrieved by invoking smart contract function calls associated with the resolver smart contract. In some embodiments, the resolver smart contract functionality is implemented within a blockchain's registry smart contract. In some embodiments, the resolver smart contract and the blockchain's registry smart contract are implemented as two different smart contracts.

At 607, a resolution result is provided. For example, based on the resolution request, the appropriate resolution result is provided. In some embodiments, the blockchain layer of the domain is provided as a resolution result. In some embodiments, an address of the appropriate blockchain registry and/or resolver smart contract is provided as a resolution result. In some embodiments, the resolution result provided is a parsed target record for one or more requested record types. For example, depending on the type of resolution request received, different resolution results can be provided. A resolution request that requests to resolve a cryptocurrency account address of a domain returns the resolved cryptocurrency account address from the target record of the domain. As another example, a resolution request requests that only the blockchain layer of the domain can return the address of the appropriate blockchain layer registry smart contract (e.g., a layer-1 blockchain registry or a layer-2 blockchain registry, as appropriate) and/or the address of the corresponding resolver smart contract from the appropriate blockchain layer.

At 609, the resolution result is cached, if appropriate. For example, in some embodiments, the process of FIG. 6 is performed by a resolution service. The resolution service can perform domain resolution for a significant number of clients and may service a high number of resolution requests per second. To improve the performance of resolution requests, cache resolution results can be utilized for subsequent resolution requests, avoiding the need to repeat a query to a meta registry and/or to reanalyze different registry query results. In some embodiments, utilizing cached results allows for resolution without contacting the distributed blockchains of the multi-layer blockchain-based name service. While a resolution request can be serviced from a valid cached resolution result with significant performance improvements, in some embodiments, a resolution request can specify that a cache result should not be utilized and that the resolution is to be performed using non-cached results. In some embodiments, caching is performed instead by (or in addition to) tracking the changes to the applicable blockchain layers. By tracking the blockchain state changes as they occur (or periodically at an interval and/or triggered threshold value), a resolution service can locally store a cached version of the blockchain updates and/or relevant blockchain data to increase resolution performance and reliability.

Figure 7:
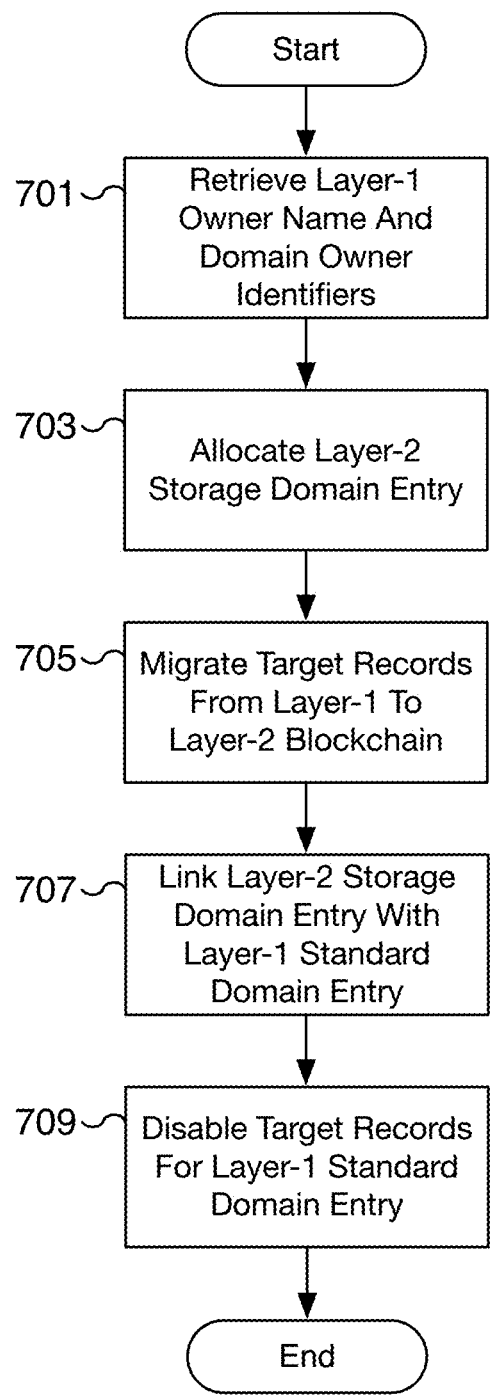
FIG. 7 is a flowchart illustrating an embodiment of a process for migrating a domain of a multi-layer blockchain-based name service from a lower layer blockchain to a higher layer blockchain.
Figure 8:
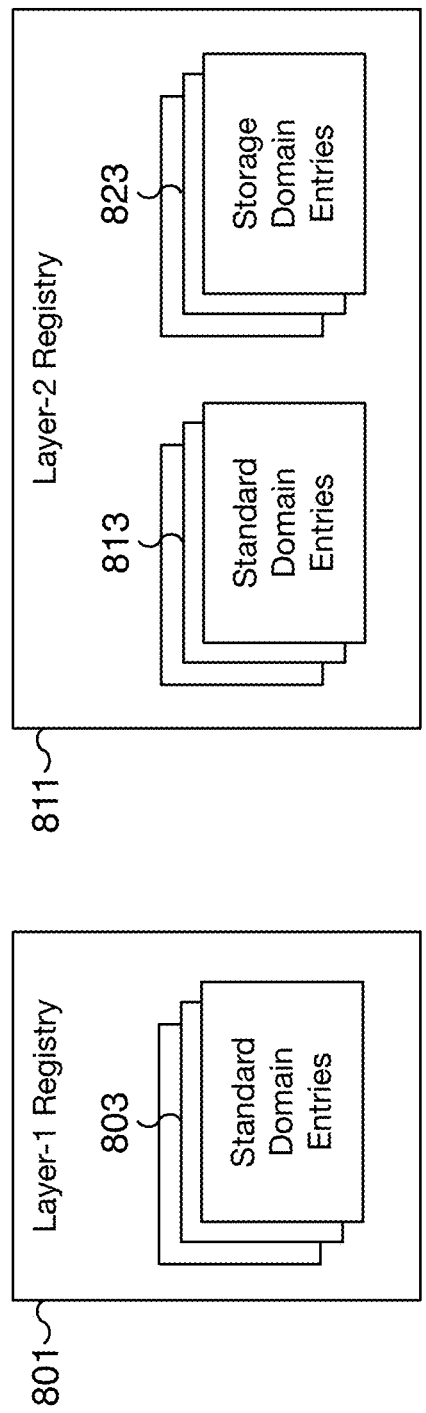
FIG. 8 is a block diagram illustrating an embodiment of registry components for a two-layer blockchain-based name service.
Figure 9:
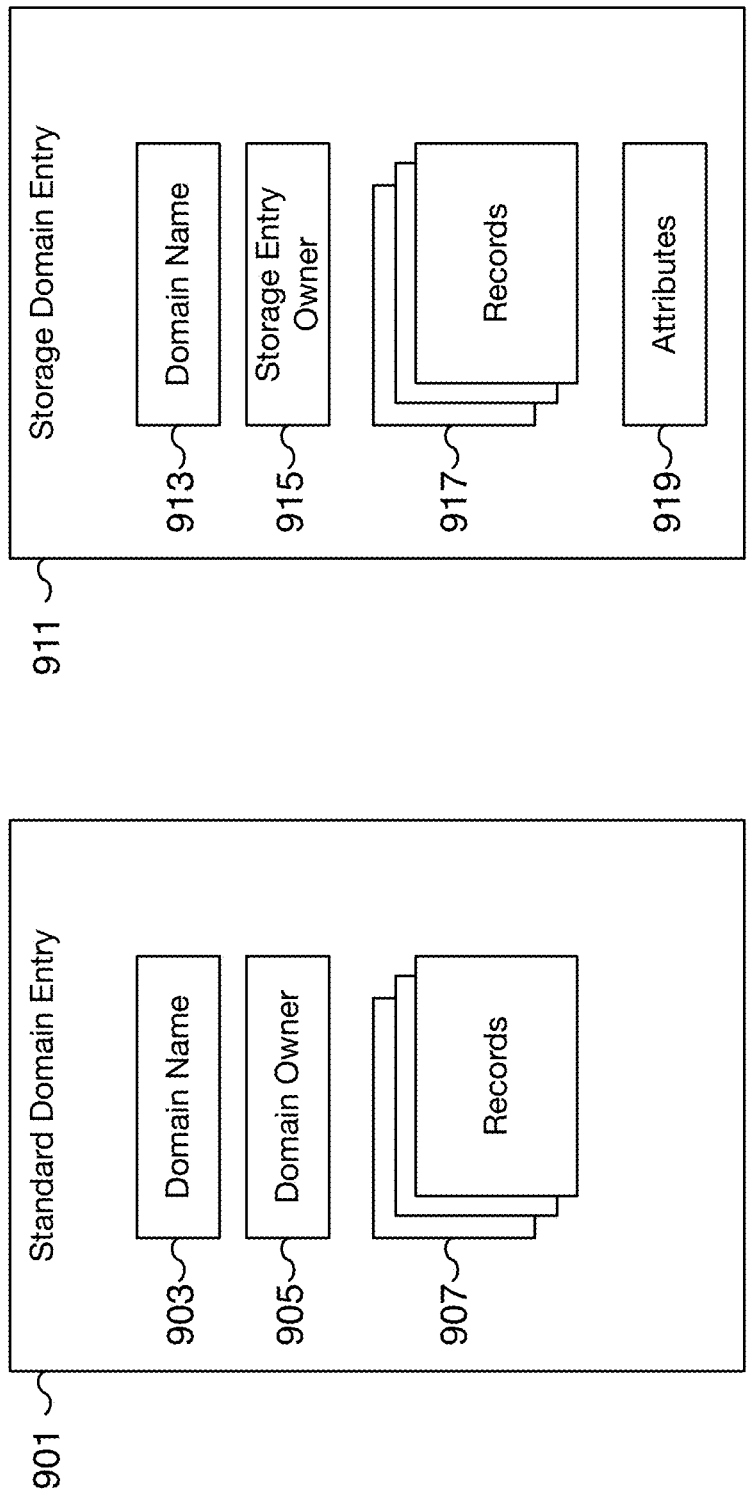
FIG. 9 is a block diagram illustrating an embodiment of registry entry components for a two-layer blockchain-based name service.

FIG. 7 is a flowchart illustrating an embodiment of a process for migrating a domain of a multi-layer blockchain-based name service from a lower layer blockchain to a higher layer blockchain. For example, using the process of FIG. 7, a domain of a multi-layer blockchain-based name service can be migrated from a layer-1 blockchain to a layer-2 blockchain. While the domain migration process can be performed utilizing a layer bridge, such as bridge 1111 of FIG. 11, the process of FIG. 7 is optimized to minimize transaction costs for interacting with the lower layer blockchain, e.g., the layer-1 blockchain. Although the migration process of FIG. 7 is described with respect to migrating from a layer-1 blockchain to a layer-2 blockchain, a same technique can be applied to migrate from a lower layer blockchain to a next higher layer blockchain (e.g., from a layer-2 blockchain to a layer-3 blockchain). In some embodiments, the process of FIG. 7 is performed at 207 of FIG. 2 and/or at 303, 305, and/or 307 of FIG. 3. In various embodiments, the multi-layer blockchain-based name service environment is the multi-layer blockchain-based name service environment of FIG. 1. In some embodiments, the layer-1 and layer-2 registries described by the process of FIG. 7 are shown in FIG. 8 and an example of the associated standard domain entries and storage domain entries are shown in FIG. 9.

At 701, the domain name and owner name identifiers are retrieved from the layer-1 blockchain. For example, domain name and owner name identifiers of the domain that is to be migrated are retrieved from the appropriate layer-1 standard domain entry. In various embodiments, the domain name uniquely identifies the domain and the domain owner uniquely identifies the owner of the domain. In some embodiments, the domain name and owner name identifiers are hash identifiers. For example, the domain name can be represented as a hash identifier. In some embodiments, the domain owner is a cryptocurrency account address or a public address of the owner. In various embodiments, the domain name and domain owner identifiers are stored in a layer-1 standard domain entry in and/or referenced by a layer-1 registry that tracks domains minted on the layer-1 blockchain. The layer-1 registry can be implemented using a registry smart contract. Using the layer-1 registry, the standard domain entry of the domain is identified, and the stored domain name and domain owner are retrieved.

At 703, a layer-2 storage domain entry is allocated. For example, a layer-2 storage domain entry is allocated on the layer-2 blockchain using the layer-2 registry. In some embodiments, the layer-2 registry, similar to the layer-1 registry, is implemented using a registry smart contract. The layer-2 registry can store and/or reference both standard domain entries as well as storage domain entries. For domains originally minted on the layer-2 blockchain, the domain information, such as ownership information and target records, can be stored in a standard domain entry. For domains originally minted on the layer-1 blockchain and then migrated to the layer-2 blockchain, the domain information is stored in a storage domain entry. At 703, a storage domain entry is allocated and identified for storing information for the domain to be migrated.

At 705, the target records of the domain are migrated from the layer-1 blockchain to the layer-2 blockchain. In various embodiments, the target records of the layer-2 storage domain entry allocated at 703 are initialized using the target records of the domain's layer-1 standard domain entry. In some embodiments, the target records can be updated with new values (for example, as provided by the owner) as part of the migration process. Once the migration process is complete, the target records of the layer-2 storage domain entry become the authoritative records for resolving the domain. In various embodiments, the target records in the layer-1 standard domain entry are left unmodified.

At 707, the layer-2 storage domain entry is linked with the layer-1 standard domain entry. By linking a layer-2 entry to a layer-1 entry, a resolution service will look to the layer-2 blockchain for the domain and its configured information. Moreover, future modifications to the domain can utilize the layer-2 blockchain. For example, the storage domain entry allocated at 703 is linked to the layer-1 standard domain entry of the domain by utilizing the domain name and domain owner identifiers retrieved at 701. In various embodiments, the linking is performed by setting the domain name of the newly allocated layer-2 storage domain entry to the same domain name of the domain's layer-1 standard domain entry using the domain name identifier retrieved at 701. Similarly, the storage entry owner of the newly allocated layer-2 storage domain entry is set to the domain owner of the domain's layer-1 standard domain entry using the domain owner identifier retrieved at 701. By ensuring that the values for the domain names match and that the storage entry owner matches the domain owner, a domain's layer-2 storage domain entry is linked with its layer-1 standard domain entry.

In various embodiments, since a blockchain can allow users to create storage records that resemble a storage domain entry, only a valid layer-2 storage domain entry will be associated with the domain and used for domain resolution and other domain functions. In various embodiments, a valid layer-2 storage domain entry for a domain has a domain name that matches the domain name of the domain's layer-1 standard domain entry and a storage entry owner that matches the domain owner of the domain's layer-1 standard domain entry. When the domain names do not match or the storage entry owner does not match the domain owner, the storage domain entry is not associated with the domain's layer-1 standard domain entry and is not treated as a valid storage domain entry for that particular domain name.

At 709, the target records for the layer-1 standard domain entry are disabled. For example, a domain attribute is set at the layer-2 blockchain that disables using the layer-1 blockchain for domain resolution and management. In some embodiments, the domain attribute is stored in the layer-2 registry and/or as part of an attribute of the layer-2 storage domain entry. When resolution is performed, the domain attribute is read from the layer-2 blockchain to determine whether domain actions should utilize the layer-2 storage domain entry instead of the layer-1 standard domain entry. When a domain is migrated from the layer-1 blockchain to the layer-2 blockchain, the domain attribute is activated to set the layer-2 data records as the authoritative records. In some embodiments, the domain attribute further invalidates the corresponding data records of the domain stored with the domain entry on the layer-1 blockchain. By writing the domain attribute at the layer-2 blockchain, the migration can be completed without transacting on the layer-1 blockchain.

FIG. 8 is a block diagram illustrating an embodiment of registry components for a two-layer blockchain-based name service. In the example shown, layer-1 registry 801 and layer-2 registry 811 are shown. The two registries 801 and 811 correspond to registries for a two-layer blockchain-based name service. Layer-1 registry 801 corresponds to a layer-1 blockchain and layer-2 registry 811 corresponds to a layer-2 blockchain. Each registry 801 and 811 is utilized to track the domains minted on their respective blockchains. In various embodiments, layer-1 registry 801 and layer-2 registry 811 are implemented as smart contracts and include both code components and storage components. For the purpose of FIG. 8, only storage components are shown, and the storage components shown are the ones relevant to the migration process of FIG. 7 and the resolution process of FIG. 10. Additional code and storage components that are not shown may exist. In some embodiments, layer-1 registry 801 exists on and for layer-1 blockchain 121 of FIG. 1 and layer-2 registry 811 exists on and for layer-2 blockchain 123 of FIG. 1. In various embodiments, layer-1 registry 801 and layer-2 registry 811 can be utilized for the processes of FIGS. 2-7 and/or FIG. 10.

In various embodiments, for a multi-layer blockchain-based name service, the different registries, such as layer-1 registry 801 and layer-2 registry 811, must be consistent. For example, the same domain name cannot be validly minted on two different blockchains and be owned by two different owners. In order to track a domain, information of a domain and its properties, such as its target records, are stored in a standard domain entry and/or a storage domain entry. In some embodiments, for each particular blockchain, standard domain entries are utilized for domains minted on that blockchain and storage domain entries are utilized for domains minted on a different blockchain and then migrated to that blockchain.

In the example shown, layer-1 registry 801 includes standard domain entries 803 and layer-2 registry 811 includes both standard domain entries 813 and storage domain entries 823. Each entry of standard domain entries 803 and 813 and storage domain entries 823 can be used to store information for a domain including different domains. For example, in some embodiments, a standard domain entry stores at least the domain name, domain owner, and target records. Similarly, a storage domain entry stores at least the domain name, storage entry owner, and target records. In some embodiments, the storage domain entry also includes domain attributes. Additional details on standard domain entries and storage domain entries are discussed later in the specification in conjunction with FIG. 9.

FIG. 9 is a block diagram illustrating an embodiment of registry entry components for a two-layer blockchain-based name service. In the example shown, standard domain entry 901 and storage domain entry 911 are shown. The two entries 901 and 911 correspond to the types of entries utilized by the registries shown in FIG. 8. For example, a layer-1 registry such as layer-1 registry 801 utilizes multiple standard domain entries such as standard domain entry 901 and a layer-2 registry such as layer-2 registry 811 utilizes multiple standard domain entries such as standard domain entry 901 and as well as multiple storage domain entries such as storage domain entry 911. In the example of FIG. 9, standard domain entry 901 includes fields domain name 903, domain owner 905, and records 907 and storage domain entry 911 includes fields domain name 913, storage entry owner 915, records 917, and attributes 919. For the purpose of FIG. 9, the components shown of entries 901 and 911 are the ones relevant to the migration process of FIG. 7 and the resolution process of FIG. 10 and additional components of entries 901 and 911 may exist but are not shown.

In the example shown, domain name 903 and domain name 913 store a domain name or domain name identifier. This matches the domain name that is purchased and is subsequently managed by a user using the process of FIG. 2. In some embodiments, the domain name identifier is stored as a hash identifier. Domain owner 905 and storage entry owner 915 are used to store the owner of the standard domain entry and storage domain entry, respectively. In some embodiments, the domain owner or storage entry owner identifiers are stored using a cryptocurrency account address or a public address of the owner. In various embodiments, records 907 and 917 are records such as target records used to store information such as resolution information of the domain. Attributes 919 of storage domain entry 911 is used to store domain attributes including migration attributes. Attributes 919 can include a domain attribute to disable the corresponding layer-1 standard domain entry for a domain once the migration of the domain to a layer-2 blockchain is complete. For example, a domain attribute can invalidate target records of the layer-1 standard domain entry and require that the target records of the layer-2 storage domain entry be used instead.

In various embodiments, when a domain is migrated from a lower layer blockchain to a higher layer blockchain, a storage domain entry such as storage domain entry 911 is allocated to replicate the domain information from the lower layer blockchain on the higher layer blockchain. As part of the migration process, the standard domain entry for the particular domain at the lower layer blockchain (e.g., the layer-1 blockchain) is used to initialize the corresponding storage domain entry (e.g., stored on the layer-2 blockchain). The value of domain name 913 is set to the value of domain name 903 and the value of storage entry owner 915 is set to domain owner 905. During the migration process, records 907 can be replicated at records 917. This transfers the records including the target records from the layer-1 blockchain to the layer-2 blockchain. Subsequent management of the domain takes place at the layer-2 blockchain. For example, instead of modifying and transacting with records 907 of standard domain entry 901, modifications and transactions are performed with respect to records 917 of storage domain entry 911.

Figure 10:
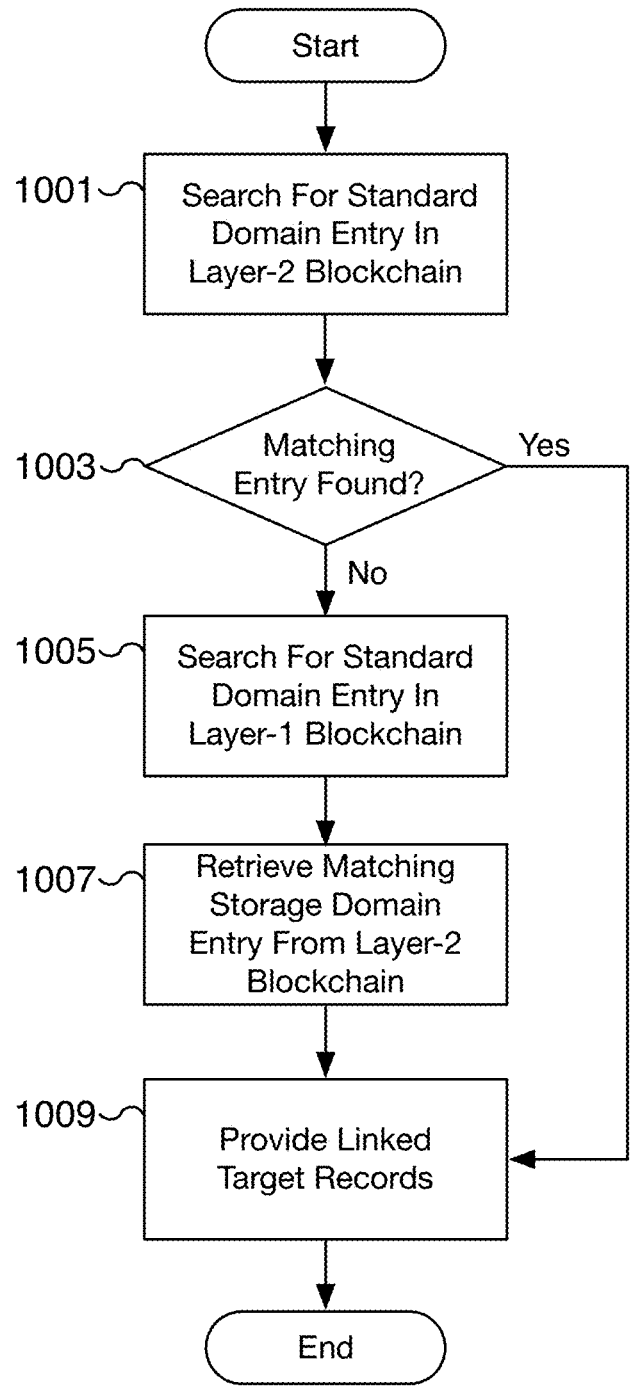
FIG. 10 is a flowchart illustrating an embodiment of a process for resolving a layer-2 domain of a two-layer blockchain-based name service.

FIG. 10 is a flowchart illustrating an embodiment of a process for resolving a layer-2 domain of a two-layer blockchain-based name service. Using the process of FIG. 10, domains originally minted on or migrated to the layer-2 blockchain of a two-layer blockchain-based name service can be resolved. In particular, the resolution process of FIG. 10 is compatible with a blockchain-based name service implementing the migration process of FIG. 7 and utilizing the registries of FIG. 8 and the entries of FIG. 9. The process of FIG. 10 identifies the particular standard domain or storage entry for a domain managed on the layer-2 blockchain and allows the linked or associated domain data records to be retrieved. In some embodiments, the process of FIG. 10 is performed at 603 and/or 605 of FIG. 6 as part of a domain resolution process. In some embodiments, the process of FIG. 10 is performed at 207 of FIG. 2, at 303, 305, and/or 307 of FIG. 3, and/or at 503 of FIG. 5. In some embodiments, the resolution process is performed by a management service such as management service 111 of FIG. 1 and/or by a resolution service such as resolution service 113 of FIG. 1. In various embodiments, the two-layer blockchain-based name service environment is the multi-layer blockchain-based name service environment of FIG. 1 and utilizes layer-1 blockchain 121 for a layer-1 blockchain and layer-2 blockchain 123 for a layer-2 blockchain. Although the resolution process of FIG. 10 is described with respect to resolving a domain between a layer-1 blockchain to a layer-2 blockchain, a same technique can be applied to resolve a domain between a different lower layer blockchain to its next higher layer blockchain (e.g., between a layer-2 blockchain and a layer-3 blockchain).

At 1001, a standard domain entry for the domain to be resolved is searched for in the layer-2 blockchain. For example, the standard domain entries stored at a layer-2 blockchain are searched to find a matching standard domain entry for the domain to be resolved. In some embodiments, the search is performed using the layer-2 registry such as layer-2 registry 811 of FIG. 8 to determine whether the appropriate standard domain entry for the domain exists among standard domain entries 813 of FIG. 8. A standard domain entry matches the domain to be resolved only if the domain name such as domain name 903 of FIG. 9 of the standard domain entry matches the domain name to be resolved. In various embodiments, a matching standard domain entry for the domain only exists in the layer-2 blockchain if the domain was originally minted on the layer-2 blockchain.

At 1003, a determination is made whether a matching standard domain entry is found in the layer-2 registry. In the event a matching standard domain entry is found in the layer-2 registry, processing proceeds to 1009 where the linked or associated target records of the domain can be retrieved using the found matching standard domain entry. In the event a matching standard domain entry is not found in the layer-2 registry, processing proceeds to 1005.

At 1005, a standard domain entry for the domain is searched for in the layer-1 blockchain. For example, the standard domain entries stored at a layer-1 blockchain are searched to find a matching standard domain entry for the domain to be resolved. In some embodiments, the search is performed using the layer-1 registry such as layer-1 registry 801 of FIG. 8 to find the appropriate standard domain entry for the domain among standard domain entries 803 of FIG. 8. A standard domain entry matches the domain to be resolved only if the domain name such as domain name 903 of FIG. 9 of the standard domain entry matches the domain name to be resolved. In various embodiments, a matching standard domain entry for the domain exists in the layer-1 blockchain since the domain was originally minted on the layer-1 blockchain.

At 1007, a matching storage domain entry is retrieved from the layer-2 blockchain. For example, the storage domain entry matching properties of the standard domain entry found at 1005 is retrieved. In some embodiments, the search is performed using the layer-2 registry such as layer-2 registry 811 of FIG. 8 to find the matching storage domain entry for the domain among storage domain entries 823 of FIG. 8. The matching storage domain entry has the same domain name as the layer-1 standard domain entry (e.g., the components domain name 903 and 913 of FIG. 9 match) and a storage entry owner that matches the domain owner of the layer-1 standard domain entry (e.g., the components storage entry owner 915 and domain owner 905 of FIG. 9 match). By requiring that the storage entry owner matches the domain owner of the layer-1 standard domain entry, the resolution process prevents invalid storage domain entries from being associated with the domain. In various embodiments, the domain attribute of the matching storage domain entry (e.g., attributes 919 of FIG. 9) can include a domain attribute that sets the target records of the matching storage entry domain as the authoritative source for resolving the domain. In various embodiments, the matching storage domain entry is created when the domain is migrated from the layer-1 blockchain to the layer-2 blockchain. At 1007, the matching storage domain entry is identified as the domain entry to use for resolving the domain. Processing proceeds to 1009 where the linked or associated target records of the domain can be retrieved using the found matching storage domain entry.

In some scenarios, the domain being resolved is not a layer-2 domain but actually a layer-1 domain of a two-layer blockchain-based name service. An example layer-1 domain is a domain minted on the layer-1 blockchain and never migrated to the layer-2 blockchain. A layer-1 domain can also include a domain originally minted on the layer-1 blockchain, migrated to the layer-2 blockchain, and then migrated back to the layer-1 blockchain. In some embodiments, the migration back to the layer-1 blockchain is achieved by setting a domain attribute for the domain that disables the layer-2 storage domain entry for the domain. Although the process of FIG. 10 is utilized for resolving a layer-2 domain, a similar process can be utilized for resolving a layer-1 domain. For a layer-1 domain, at step 1007, no matching storage domain entry is found or potentially a matching storage domain entry is found that has been disabled. For example, either no matching storage domain entry is found or a storage domain entry is found with the proper name and owner but with a domain attribute that disables the layer-2 storage domain entry. In the event no matching valid and enabled storage domain entry is found on the layer-2 blockchain for the domain, the domain is a layer-1 domain and the standard domain entry used for resolution is the standard domain entry found on the layer-1 blockchain at 1005. To resolve the layer-1 domain, processing proceeds to 1009 where the linked or associated target records of the layer-1 domain can be retrieved using the layer-1 standard domain entry found at 1005.

At 1009, the linked or associated target records are provided. For example, the target records of the identified standard domain or storage domain entry are provided. In various embodiments, the address of the target records is provided and/or the actual data stored in the target records is provided.

Figure 11:
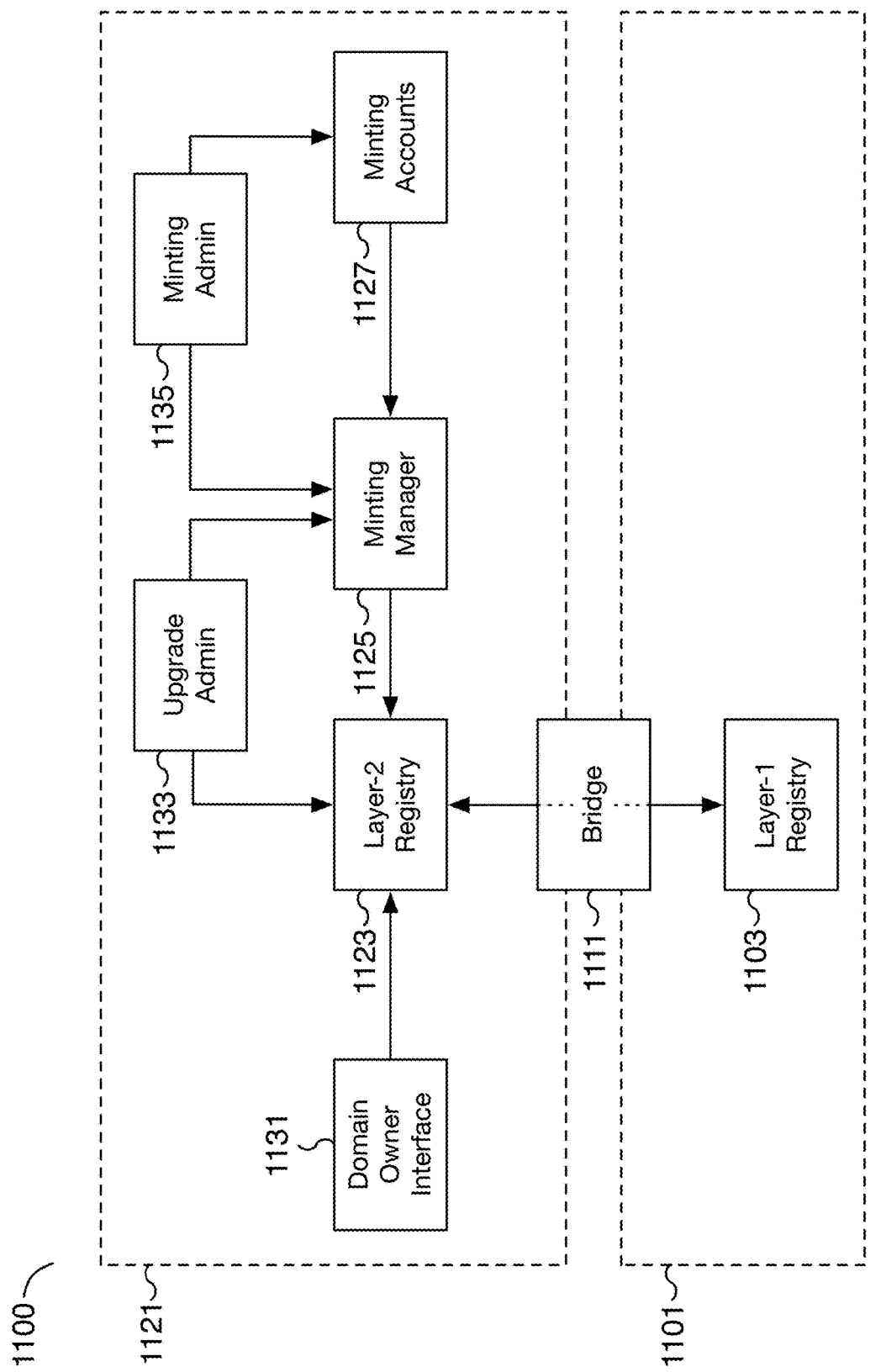
FIG. 11 is a block diagram illustrating an embodiment of a meta registry for a two-layer blockchain-based name service.

FIG. 11 is a block diagram illustrating an embodiment of a meta registry for a two-layer blockchain-based name service. In various embodiments, meta registry 1100 can be used to perform management actions for a domain of a two-layer blockchain-based name service. In the example shown, meta registry 1100 includes layer-1 blockchain 1101 and layer-2 blockchain 1121 connected by bridge 1111. Layer-1 blockchain 1101 includes layer-1 registry 1103. Layer-2 blockchain 1121 includes components layer-2 registry 1123, minting manager 1125, minting accounts 1127, domain owner interface 1131, upgrade admin 1133, and minting admin 1135. In various embodiments, the various components are implemented using one or more smart contracts and additional components may exist but are not shown. For example, similar to layer-2 blockchain 1121, layer-1 blockchain 1101 includes a corresponding minting manager, minting accounts, upgrade admin, minting admin, and domain owner interface for corresponding functionality but the components are not shown. In some embodiments, meta registry 1100 is part of the multi-layer blockchain-based name service environment of FIG. 1. For example, in some embodiments, layer-1 blockchain 1101 and layer-2 blockchain 1121 are layer-1 blockchain 121 and layer-2 blockchain 123 of FIG. 1, respectively, and bridge 1111 is bridge 131 of FIG. 1. In some embodiments, layer-1 registry 1103 and layer-12 registry 1123 are layer-1 registry 801 and layer-2 registry 811 of FIG. 8, respectively. In various embodiments, meta registry 1100 is used to implement at least portions of the processes of FIGS. 2-7 and FIG. 10.

In the example shown, each of layer-1 blockchain 1101 and layer-2 blockchain 1121 have their own registry, layer-1 registry 1103 and layer-2 registry 1123, respectively, that can be implemented as smart contracts. The two registries are connected via bridge 1111. In some embodiments, bridge 1111 is implemented as one or more smart contracts with smart contract components on both layer-1 blockchain 1101 and layer-2 blockchain 1121. Bridge 1111 can be utilized to control transactions, such as deposits, withdrawals, and other blockchain activities, that require interfacing between layer-1 blockchain 1101 and layer-2 blockchain 1121. For example, bridge 1111 can be used to withdraw an asset such as a domain from layer-1 blockchain 1101 and deposit the asset onto layer-2 blockchain 1121. In the example shown, bridge 1111 is but one example of a bridge smart contract. Additional bridge smart contracts (not shown) can be used in parallel with bridge 1111 as well. For example, other bridge smart contracts with different operational profiles (e.g., cost structure, latency, throughput, reliability, popularity, preference, etc.) can be utilized based on the particular usage scenario.

In various embodiments, the two registries layer-1 registry 1103 and layer-2 registry 1123 each track domains that have been minted and are used at least in part to resolve the domains minted on and/or migrated to their respective blockchains. In some embodiments, layer-2 registry 1123 is a domain registry that tracks the domains minted on or migrated to layer-2 blockchain 1121, the address of resolution records for the domains minted on or migrated to layer-2 blockchain 1121, and the domains minted on layer-1 blockchain 1101. Layer-2 registry 1123 tracks the domains minted on layer-1 blockchain 1101 to ensure that a domain minted on layer-1 blockchain 1101 is not overwritten or minted on layer-2 blockchain 1121. Similar to layer-2 registry 1123, layer-1 registry 1103 is a domain registry that tracks the domains minted on layer-1 blockchain 1101 and their corresponding resolution records. In the event the two-layer blockchain-based name service allows new domains to be minted on or migrated to layer-1 blockchain 1101, layer-1 registry 1103 additionally tracks the domains migrated to layer-1 blockchain 1101, the address of resolution records for the domains migrated to layer-1 blockchain 1101, and the domains minted on layer-2 blockchain 1121. In various embodiments, layer-1 registry 1103 and layer-2 registry 1123 interface with bridge 1111 to migrate a domain between blockchain layers, for example, by performing a series of deposit and withdrawal transactions for the domain using bridge 1111.

In some embodiments, meta registry 1100 can be interfaced with via domain owner interface 1131. Domain owner interface 1131 can be implemented by one or more smart contracts on layer-2 blockchain 1121. For example, using domain owner interface 1131, a user can transfer, configure, and/or modify permissions for an owner's domain. In various embodiments, a user can initiate a management action request to domain owner interface 1131 via a management service such as management service 111 of FIG. 1. In some embodiments, each management action request can reference a domain name and includes a domain owner identifier. For example, a domain name can be referenced by a domain name identifier such as a hash identifier and the domain owner identifier can be authenticated using a public/private key pair. In some embodiments, the authentication of the requested management action is performed at least in part by layer-2 registry 1123. For example, layer-2 registry 1123 can be implemented as a smart contract on layer-2 blockchain 1121 and authenticate received management actions.

In various embodiments and in the example shown, meta registry 1100 includes administrative smart contracts implemented on layer-2 blockchain 1121 such as upgrade admin 1133 and minting admin 1135. Upgrade admin 1133 can be implemented as an administrative smart contract to control the list of bridges authorized for interfacing between layer-1 blockchain 1101 and layer-2 blockchain 1121. Other administrative actions upgrade admin 1133 can be implemented to perform include the ability to control properties/functionality related to non-fungible tokens (NTFs) such as domain names and/or other NFTs including NFTs that are Ethereum Request for Comment 721 (ERC-721) compliant. Properties and functionality that can be controlled by upgrade admin 1133 can include metadata server locations, the list of allowable top-level domains (TLDs), and upgrades. For example, upgrade admin 1133 can interface with layer-2 blockchain 1121 to control supported bridges and with minting manager 1125 to control the list of allowable top-level domains (TLDs) and upgrades. Meta registry 1100 also includes minting admin 1135 which can be implemented as an administrative smart contract to control the list of valid minting accounts that are part of minting accounts 1127.

In some embodiments, a domain is minted on layer-2 blockchain 1121 by one of the authorized minting accounts of minting accounts 1127. For example, the accounts of minting accounts 1127 are implemented as smart contracts to mint and pre-configure domains. Minting accounts 1127 can include multiple accounts to increase the minting throughput. In various embodiments, minting manager 1125 is implemented as a smart contract and functions to relay the minting and pre-configuration performed by minting accounts 1127 to layer-2 registry 1123. In some embodiments, minting manager 1125 can further select one of the minting accounts of minting accounts 1127 to perform the minting of a domain and/or layer-2 registry 1123, upon authenticating a management action request to mint the new domain, can trigger one of the minting accounts of minting accounts 1127 to mint the new domain. Although the functionality described herein has been divided between the different components of meta registry 1100, including the different smart contracts of layer-2 blockchain 1121, other divisions, such as delegating functional and administrative responsibility to different components than as described above, are appropriate as well. Moreover, although the above components were detailed and described primarily with respect to minting a domain on layer-2 blockchain 1121, corresponding components of layer-1 blockchain 1101 exist but are not shown for minting a domain on layer-1 blockchain 1101 using techniques similar to the ones described above.

In various embodiments, in the event meta registry 1100 includes multiple layer-2 blockchains, meta registry 1100 can further include an arbitration smart contract (not shown) for adjudicating disputes between the different blockchains including the different layer-2 blockchains. For example, an arbitration smart contract can determine which layer-2 blockchains can mint which domains. In some embodiments, the arbitration smart contract can include different smart contract components on the different blockchains that can interface with one another.

Figure 12:
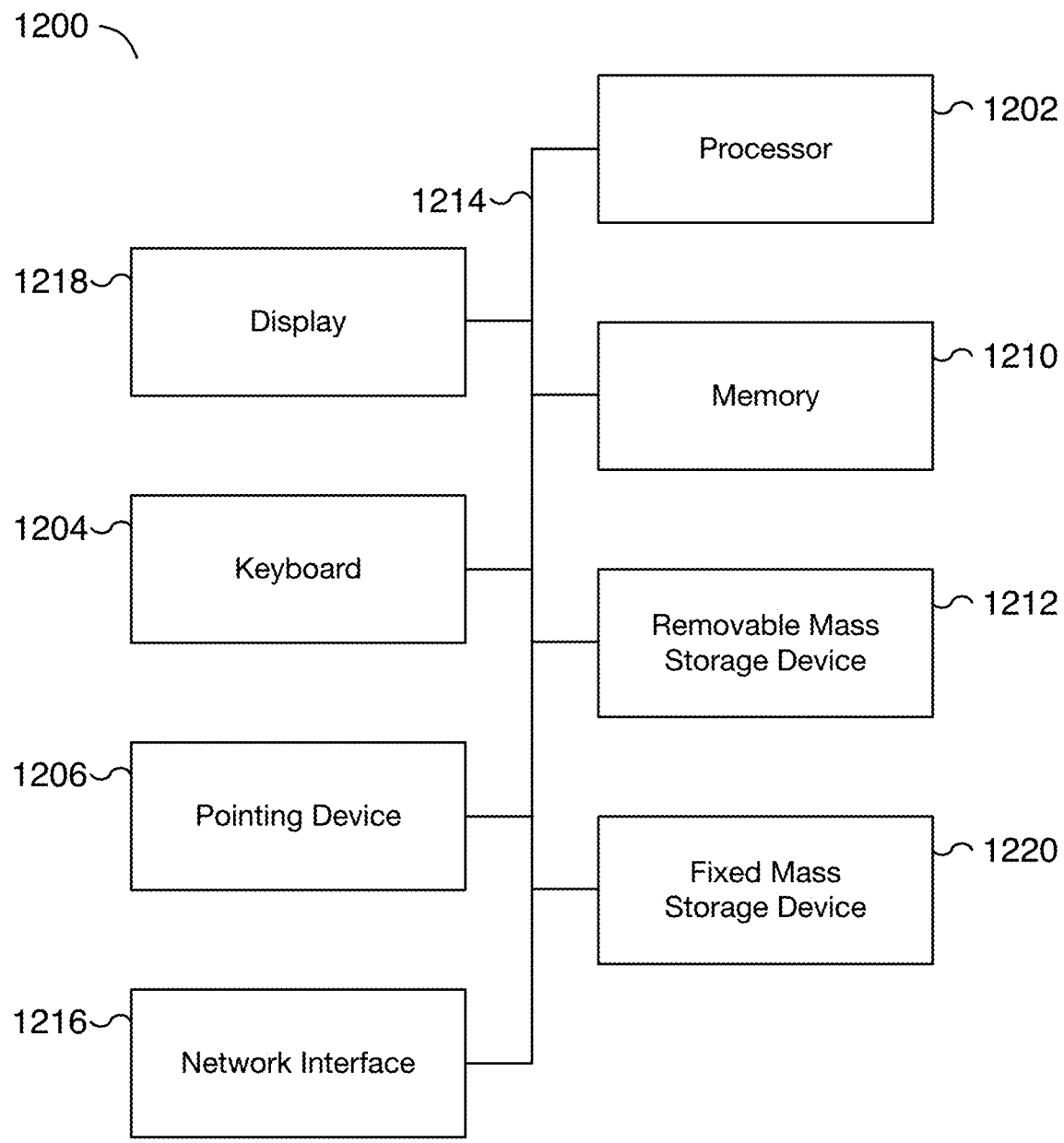
FIG. 12 is a functional diagram illustrating a programmed computer system for using, managing, or executing a multi-layer blockchain-based name service in accordance with some embodiments.

FIG. 12 is a functional diagram illustrating a programmed computer system for using, managing, or executing a multi-layer blockchain-based name service in accordance with some embodiments. As will be apparent, other computer system architectures and configurations can be used to use, manage, or execute the blockchain-based name service. Examples of computer system 1200 include client 101 of FIG. 1, one or more computers included in management service 111 of FIG. 1, one or more computers included in resolution service 113 of FIG. 1, or one or more computers included in layer-1 blockchain 121, layer-2 blockchain 123, and/or layer-N blockchain 129 of FIG. 1. Computer system 1200, which includes various subsystems as described below, includes at least one microprocessor subsystem (also referred to as a processor or a central processing unit (CPU)) 1202. For example, processor 1202 can be implemented by a single-chip processor or by multiple processors. In some embodiments, processor 1202 is a general purpose digital processor that controls the operation of the computer system 1200. Using instructions retrieved from memory 1210, the processor 1202 controls the reception and manipulation of input data, and the output and display of data on output devices (e.g., display 1218). In various embodiments, one or more instances of computer system 1200 can be used to implement at least portions of the processes of FIGS. 2-7 and FIG. 10.

Processor 1202 is coupled bi-directionally with memory 1210, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1202. Also as is well known in the art, primary storage typically includes basic operating instructions, program code, data and objects used by the processor 1202 to perform its functions (e.g., programmed instructions). For example, memory 1210 can include any suitable computer-readable storage media, described below, depending on whether, for example, data access needs to be bi-directional or unidirectional. For example, processor 1202 can also directly and very rapidly retrieve and store frequently needed data in a cache memory (not shown).

A removable mass storage device 1212 provides additional data storage capacity for the computer system 1200, and is coupled either bi-directionally (read/write) or unidirectionally (read only) to processor 1202. For example, storage 1212 can also include computer-readable media such as magnetic tape, flash memory, PC-CARDS, portable mass storage devices, holographic storage devices, and other storage devices. A fixed mass storage 1220 can also, for example, provide additional data storage capacity. The most common example of mass storage 1220 is a hard disk drive. Mass storages 1212, 1220 generally store additional programming instructions, data, and the like that typically are not in active use by the processor 1202. It will be appreciated that the information retained within mass storages 1212 and 1220 can be incorporated, if needed, in standard fashion as part of memory 1210 (e.g., RAM) as virtual memory.

In addition to providing processor 1202 access to storage subsystems, bus 1214 can also be used to provide access to other subsystems and devices. As shown, these can include a display monitor 1218, a network interface 1216, a keyboard 1204, and a pointing device 1206, as well as an auxiliary input/output device interface, a sound card, speakers, and other subsystems as needed. For example, the pointing device 1206 can be a mouse, stylus, track ball, or tablet, and is useful for interacting with a graphical user interface.

The network interface 1216 allows processor 1202 to be coupled to another computer, computer network, or telecommunications network using a network connection as shown. For example, through the network interface 1216, the processor 1202 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1202 can be used to connect the computer system 1200 to an external network and transfer data according to standard protocols. For example, various process embodiments disclosed herein can be executed on processor 1202, or can be performed across a network such as the Internet, intranet networks, or local area networks, in conjunction with a remote processor that shares a portion of the processing. Additional mass storage devices (not shown) can also be connected to processor 1202 through network interface 1216.

An auxiliary I/O device interface (not shown) can be used in conjunction with computer system 1200. The auxiliary I/O device interface can include general and customized interfaces that allow the processor 1202 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 12 is but an example of a computer system suitable for use with the various embodiments disclosed herein. Other computer systems suitable for such use can include additional or fewer subsystems. In addition, bus 1214 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a request to perform a management action for a domain of a name service, wherein the name service is implemented using at least both a first blockchain network and a second blockchain network different from the first blockchain network;
determining whether the domain is currently managed on the first blockchain network or the second blockchain network including by reading from a domain registry of the second blockchain network, wherein the domain registry of the second blockchain network tracks domains minted on the first blockchain network and the second blockchain network; and
causing the management action for the domain to be performed based on the determination of whether the domain is currently managed on the first blockchain network or the second blockchain network.

2. The method of claim 1, wherein the management action includes a migration action to transition the domain from the first blockchain network to the second blockchain network.

3. The method of claim 2, further comprising:
receiving a second request to perform a second management action for the domain of the name service;
determining that the domain is currently managed on the second blockchain network; and
utilizing the second blockchain network to perform the second management action for the domain.

4. The method of claim 1, wherein the first blockchain network and the second blockchain network support a common set of virtual machine instructions.

5. The method of claim 1, wherein a transaction cost for processing transactions on the second blockchain network is less than $1/10,000$th a transaction cost for processing transactions on the first blockchain network.

6. The method of claim 1, wherein the domain registry of the second blockchain network is stored on the second blockchain network.

7. The method of claim 6, wherein the domain registry of the second blockchain network tracks the domains minted on the first blockchain network by storing a state of a domain registry of the first blockchain network.

8. The method of claim 7, wherein the domain registry of the second blockchain network maintains a list of domains minted on the first blockchain network.

9. The method of claim 7, wherein the domain registry of the second blockchain network stores a Merkle root representing the state of the domain registry of the first blockchain network.

10. The method of claim 1, wherein the management action includes an action to mint a new domain on the first blockchain network.

11. The method of claim 10, wherein the first blockchain network is a layer-1 blockchain and the second blockchain network is a layer-2 blockchain.

12. The method of claim 10, further comprising:
updating a registry of the first blockchain network to include an identifier of the new domain, a domain owner identifier of the new domain, and one or more resolution records for the new domain, wherein the identifier of the new domain, the domain owner identifier, and the one or more resolution records are stored on the first blockchain network; and
updating the domain registry of the second blockchain network to reflect the new domain being minted on the first blockchain network, wherein the domain registry of the second blockchain network is stored on the second blockchain network.

13. The method of claim 12, wherein the identifier of the new domain is stored as a hash identifier and the domain owner identifier is a cryptocurrency address.

14. A method, comprising:
receiving a request to migrate a domain of a name service from a first blockchain network to a second blockchain network, wherein the name service is implemented using at least both the first blockchain network and the second blockchain network different from the first blockchain network, and wherein the domain is minted on the first blockchain network;
retrieving, from a domain entry of a registry of the first blockchain network, a domain name identifier, a domain owner identifier, and records of the domain;
creating a storage domain entry for the domain on the second blockchain network, wherein the created storage domain entry includes a domain name field, a storage entry owner field, and one or more record fields; and
updating the created storage domain entry including by: setting the domain name field to the retrieved domain name identifier, setting the storage entry owner field to the retrieved domain owner identifier, and setting contents of the one or more record fields to contents of the retrieved records of the domain.

15. The method of claim 14, wherein a registry of the second blockchain network is stored on the second blockchain network, and wherein the registry of the second blockchain network includes or references the created storage domain entry.

16. The method of claim 14, wherein the created storage domain entry includes an attributes field, and wherein the attributes field includes a domain attribute corresponding to a validity of the domain entry of the registry of the first blockchain network.

17. A system, comprising:
a communication interface configured to receive a request to perform a management action for a domain managed on a first blockchain network or a second blockchain network; and
one or more processors configured to cause the management action for the domain to be performed;
wherein a layer-1 registry smart contract is implemented on the first blockchain network and the layer-1 registry smart contract is configured to track a first group of domains minted on the first blockchain network, and a layer-2 registry smart contract is implemented on the second blockchain network and the layer-2 registry smart contract is configured to track a second group of domains minted on the first blockchain network and the second blockchain network.

18. The system of claim 17, wherein the layer-1 registry smart contract and the layer-2 registry smart contract are connected by a bridge smart contract, the bridge smart contract having smart contract components implemented on the first blockchain network and the second blockchain network.

19. The system of claim 17, wherein:
an upgrade administrative smart contract is configured to control a list of bridge smart contracts that are authorized to interact with the layer-1 registry smart contract and the layer-2 registry smart contract;
a minting administrative smart contract implemented on the second blockchain network is configured to control a list of minting accounts authorized for minting a new domain on the second blockchain network;
one or more minting accounts for the second blockchain network are configured to mint a new domain in response to an authenticated action to mint the new domain; and
a minting manager smart contract implemented on the second blockchain network is configured to relay minting results of the one or more minting accounts to the layer-2 registry smart contract.

20. The system of claim 19, wherein the layer-2 registry smart contract is further configured to authenticate a management action request to mint a requested domain and trigger one of the one or more minting accounts to mint the requested domain.

* * * * *